(12) United States Patent
Leiber et al.

(10) Patent No.: US 12,384,348 B2
(45) Date of Patent: Aug. 12, 2025

(54) BRAKE SYSTEM WITH NOVEL MUX REGULATION (MUX 2.0) WITH AN OUTLET VALVE/BRAKE SYSTEM OR AN OUTLET VALVE PER BRAKE CIRCUIT, AND METHOD FOR PRESSURE CONTROL

(71) Applicant: IPGATE AG, Pfäffikon (CH)

(72) Inventors: Heinz Leiber, Oberriexingen (DE); Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 0 days.

(21) Appl. No.: 18/235,567

(22) Filed: Aug. 18, 2023

(65) Prior Publication Data

US 2023/0391306 A1  Dec. 7, 2023

Related U.S. Application Data

(63) Continuation of application No. 15/558,419, filed as application No. PCT/EP2015/081402 on Dec. 30, 2015, now Pat. No. 11,760,329.

(30) Foreign Application Priority Data

| Mar. 16, 2015 | (DE) | ..................... 20 2015 107 072.1 |
| Mar. 16, 2015 | (DE) | ..................... 20 2015 107 075.6 |
| Mar. 16, 2015 | (DE) | ..................... 20 2015 107 079.9 |

(51) Int. Cl.
  *B60T 13/00* (2006.01)
  *B60T 7/04* (2006.01)
  (Continued)

(52) U.S. Cl.
  CPC ............ *B60T 13/745* (2013.01); *B60T 7/042* (2013.01); *B60T 8/326* (2013.01); *B60T 8/4081* (2013.01);
  (Continued)

(58) Field of Classification Search
  CPC ...... B60T 7/042; B60T 8/4081; B60T 15/028; B60T 13/745
  See application file for complete search history.

(56) References Cited

U.S. PATENT DOCUMENTS

| 3,515,439 A | 6/1970 | Leonard et al. |
| 6,007,161 A | 12/1999 | Worsdorfer |
| (Continued) | | |

FOREIGN PATENT DOCUMENTS

| CN | 101039830 A | 9/2007 |
| CN | 101479141 A | 7/2009 |
| (Continued) | | |

OTHER PUBLICATIONS

Int'l Search Report issued Feb. 27, 2017 in Int'l Application No. PCT/EP2015/081401.
(Continued)

*Primary Examiner* — Nicholas J Lane
(74) *Attorney, Agent, or Firm* — Panitch Schwarze Belisario & Nadel LLP

(57) ABSTRACT

A brake system for motor vehicles may include an actuation device (e.g., brake pedal), a first piston-cylinder unit having at least one piston that separates two working chambers, a control device and a pressure supply unit driven by an electric motor and having a double-stroke piston delimiting working chambers. At least one brake circuit may have associated therewith at least one wheel brake, and each wheel brake may be connected to an associated hydraulic connecting line via a controllable switching valve. An outlet valve may be assigned to a single wheel brake or to a single wheel brake of each brake circuit in a hydraulic connection between the wheel brake and a pressure medium storage container.

15 Claims, 15 Drawing Sheets

(51) Int. Cl.
*B60T 8/32* (2006.01)
*B60T 8/40* (2006.01)
*B60T 13/68* (2006.01)
*B60T 13/74* (2006.01)
*B60T 15/02* (2006.01)

(52) U.S. Cl.
CPC .......... *B60T 8/4086* (2013.01); *B60T 13/686* (2013.01); *B60T 13/741* (2013.01); *B60T 15/028* (2013.01); *B60Y 2400/306* (2013.01); *B60Y 2400/81* (2013.01)

(56) References Cited

U.S. PATENT DOCUMENTS

| | | | |
|---|---|---|---|
| 6,231,131 | B1 | 5/2001 | Dinkel et al. |
| 7,290,841 | B2 | 11/2007 | Isono |
| 9,067,577 | B2 | 6/2015 | Ito et al. |
| 9,108,604 | B2 | 8/2015 | Bohm et al. |
| 9,205,821 | B2 | 12/2015 | Biller et al. |
| 9,399,452 | B2 | 7/2016 | Roll et al. |
| 9,566,960 | B2 | 2/2017 | Feigel |
| 9,876,416 | B2 | 1/2018 | Eckert et al. |
| 10,112,592 | B2 | 10/2018 | Leiber et al. |
| 10,421,447 | B2 | 9/2019 | Leiber et al. |
| 11,097,708 | B2 | 8/2021 | Leiber et al. |
| 2001/0020210 | A1* | 9/2001 | Hessmert ............. B60T 8/1725 180/197 |
| 2004/0207253 | A1 | 10/2004 | Nakayasu et al. |
| 2008/0179944 | A1 | 7/2008 | Spaeth |
| 2008/0216643 | A1 | 9/2008 | Cano |
| 2009/0072615 | A1* | 3/2009 | Oosawa ............. B60T 8/4072 701/79 |
| 2009/0115247 | A1* | 5/2009 | Leiber ............. B60T 8/5075 303/154 |
| 2010/0052417 | A1 | 3/2010 | Aoba et al. |
| 2012/0013173 | A1* | 1/2012 | Leiber ............. B60T 8/3265 303/189 |
| 2012/0030626 | A1 | 2/2012 | Hopkins et al. |
| 2012/0061192 | A1 | 3/2012 | Birkheim |
| 2012/0306261 | A1 | 12/2012 | Leiber et al. |
| 2013/0080016 | A1* | 3/2013 | Bohn ............. B60T 7/042 701/78 |
| 2013/0127237 | A1 | 5/2013 | Pfeiffer et al. |
| 2013/0207452 | A1 | 8/2013 | Gilles et al. |
| 2014/0333124 | A1 | 11/2014 | Koo |
| 2015/0021978 | A1 | 1/2015 | Feigel |
| 2015/0025767 | A1 | 1/2015 | Feigel |
| 2015/0028667 | A1 | 1/2015 | Leiber et al. |
| 2015/0061854 | A1 | 3/2015 | Drumm et al. |
| 2015/0069828 | A1 | 3/2015 | Ueno et al. |
| 2015/0088396 | A1 | 3/2015 | Schmitt |
| 2015/0197229 | A1 | 7/2015 | Knechtges et al. |
| 2015/0375726 | A1 | 12/2015 | Roll et al. |
| 2016/0159332 | A1* | 6/2016 | Yang ............. B60T 8/4018 303/15 |
| 2016/0207514 | A1* | 7/2016 | Knechtges ............. B60T 7/042 |
| 2016/0221554 | A1 | 8/2016 | Knechtges et al. |
| 2017/0106843 | A1 | 4/2017 | Jeong |
| 2018/0126971 | A1 | 5/2018 | Leiber et al. |
| 2019/0031165 | A1 | 1/2019 | Besier et al. |

FOREIGN PATENT DOCUMENTS

| | | |
|---|---|---|
| CN | 101909956 A | 12/2010 |
| CN | 102325676 A | 1/2012 |
| CN | 102470840 A | 5/2012 |
| CN | 102753412 A | 10/2012 |
| CN | 103253251 A | 8/2013 |
| CN | 103338988 A | 10/2013 |
| CN | 104136291 A | 11/2014 |
| CN | 104149763 A | 11/2014 |
| CN | 104169141 A | 11/2014 |
| DE | 19600603 A1 | 7/1997 |
| DE | 19601268 A1 | 7/1997 |
| DE | 19601417 A1 | 7/1997 |
| DE | 10348831 A1 | 9/2004 |
| DE | 102004014171 A1 | 3/2006 |
| DE | 102005055751 A1 | 11/2006 |
| DE | 102008046993 A1 | 4/2009 |
| DE | 102009043484 A1 | 3/2011 |
| DE | 102011077329 A1 | 1/2012 |
| DE | 102011080312 A1 | 2/2012 |
| DE | 102010051744 A1 | 5/2012 |
| DE | 102011118365 A1 | 5/2013 |
| DE | 102012002791 A1 | 8/2013 |
| DE | 102013203594 A1 | 9/2013 |
| DE | 102013222061 A1 | 9/2014 |
| DE | 102013224313 A1 | 9/2014 |
| DE | 102013210563 A1 | 12/2014 |
| DE | 102013014173 A1 | 2/2015 |
| DE | 102013014188 A1 | 2/2015 |
| DE | 102013218121 A1 | 3/2015 |
| DE | 102018205089 A1 | 10/2019 |
| GB | 1441173 A | 6/1976 |
| GB | 2160606 A | 12/1985 |
| GB | 8514430 | 12/1985 |
| GB | 2201208 A | 8/1988 |
| JP | 2000025602 A | 1/2000 |
| JP | 2000335400 A | 12/2000 |
| JP | 2002187537 A | 7/2002 |
| JP | 2005153555 A | 6/2005 |
| JP | 2007022404 A | 2/2007 |
| JP | 2008308058 A | 12/2008 |
| JP | 2009067262 A | 4/2009 |
| JP | 2009161130 A | 7/2009 |
| JP | 2011042330 A | 3/2011 |
| JP | 2013520344 A | 6/2013 |
| WO | 0074987 A1 | 12/2000 |
| WO | 0211970 A1 | 2/2002 |
| WO | 2003038246 A2 | 5/2003 |
| WO | 2009083217 A2 | 7/2009 |
| WO | 2010091883 A1 | 8/2010 |
| WO | 2014135402 A1 | 9/2014 |

OTHER PUBLICATIONS

Int'l Search Report issued Feb. 14, 2017 in Int'l Application No. PCT/EP2015/081402.
Written Opinion issued Feb. 27, 2017 in Int'l Application No. PCT/EP2015/081401.
Written Opinion issued Feb. 14, 2017 in Int'l Application No. PCT/EP2015/081402.
Int'l Search Report issued Aug. 1, 2016 in Int'l Application No. PCT/EP2015/081403.
Written Opinion issued Aug. 1, 2016 in Int'l Application No. PCT/EP2015/081403.
Int'l Preliminary Report of Patentability issued Sep. 19, 2017 in Int'l Application No. PCT/EP2015/081402.
Int'l Preliminary Report on Patentability issued Sep. 19, 2017 in Int'l Application No. PCT/EP2016/055703.
Int'l Search Report issued Jul. 28, 2016 in Int'l Application No. PCT/EP2016/055703.
Int'l Preliminary Report on Patentability issued Sep. 19, 2017 in Int'l Application No. PCT/EP2015/081403.
Int'l Prelimininary Report on Patentability issued Sep. 19, 2017 in Int'l Applicatin No. PCT/EP2015/081401.
Leiber et al., "Modular Brake System with Integrated Fuctionalities", ATZ Magazine, vol. 113, pp. 20-25 (Jun. 2011).
Office Action issued Mar. 3, 2020 in U.S. Appl. No. 15/558,385 by Leiber.
Office Action issued Oct. 22, 2020 in U.S. Appl. No. 15/558,385 by Leiber.
Office Action issued Oct. 5, 2020 in U.S. Appl. No. 15/558,438, by Leiber.
Office Action issued Jun. 25, 2020 in Indian Application No. 201717035196.
Office Action issued Dec. 19, 2019 in Japanese Application No. 2017-548871 (no translation, shown for relavance).

(56) References Cited

OTHER PUBLICATIONS

Office Action issued Oct. 19, 2020 in Japanese Application No. 2017-548871 (no translation, shown for relevance).
Office Action issued Jun. 3, 2019 in Chinese Application No. 201580077959.8 (no translation, shown for relevance).
Office Action issued Oct. 28, 2020 in Chinese Application No. 201580077959.8.
Office Action issued Oct. 17, 2022 in Japanese Application No. 2021-144039 (w/English Translation).
Decision of Refusal mailed Oct. 5, 2022 against JP Patent Application No. 2017-548861 (English translation).
Office Action issued Jun. 3, 2023 in Chinese Application No. 202111170671.9.
Office Action issued Jun. 5, 2023 in Chinese Application No. 202110785648.4 (with English Translation).
Notice of Allowance issued Mar. 9, 2024 in Chinese Application No. 202111170671.9 with English translation.
Office Action issued May 6, 2024 in U.S. Appl. No. 17/378,201.
Extended European Search Report issued Dec. 19, 2024, in EP Application No. 24194897.5.
Office Action issued on Jan. 16, 2025, in U.S. Appl. No. 17/378,201, by Leiber.

* cited by examiner

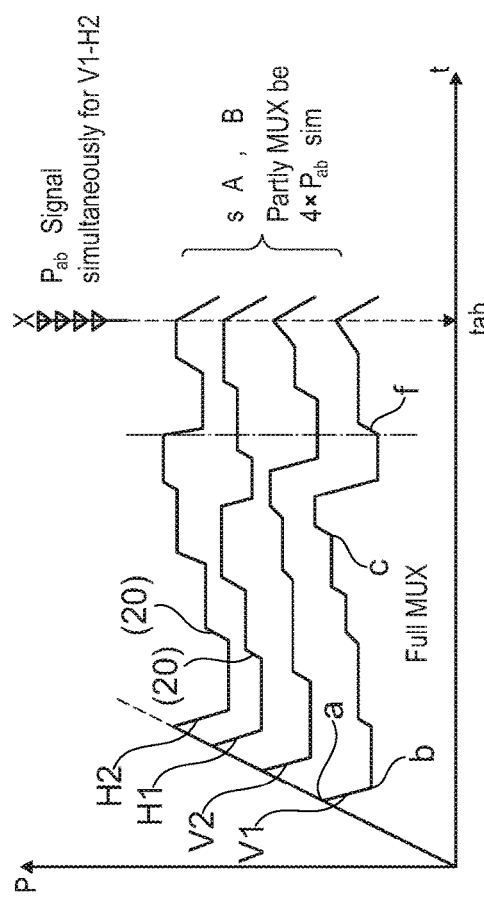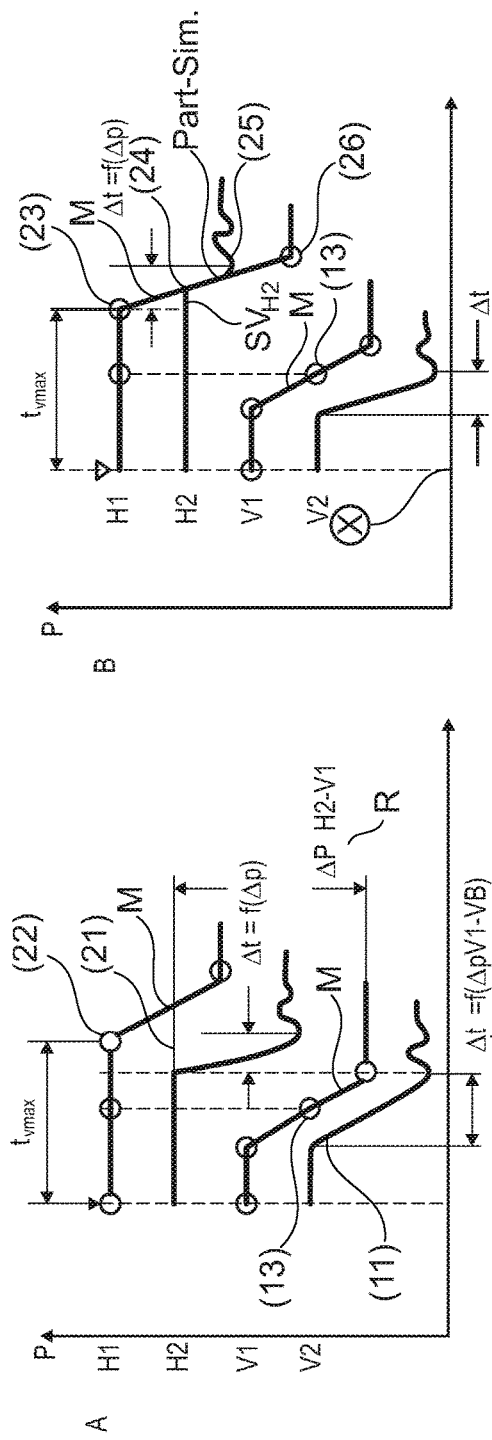
Fig. 4
Fig. 4a
Fig. 4b

BRAKE SYSTEM WITH NOVEL MUX REGULATION (MUX 2.0) WITH AN OUTLET VALVE/BRAKE SYSTEM OR AN OUTLET VALVE PER BRAKE CIRCUIT, AND METHOD FOR PRESSURE CONTROL

CROSS-REFERENCE TO RELATED APPLICATION

This application is a Continuation of co-pending U.S. patent application Ser. No. 15/558,419, filed Jan. 10, 2018, which is a Section 371 of International Application No. PCT/EP2015/081401, filed Dec. 30, 2015, which was published in the German language on Sep. 22, 2016 under International Publication No. WO 2016/146222 A3, which claims priority under 35 U.S.C. § 119(b) to German Patent Application No. 20 2015 107 079.9, filed Mar. 16, 2015, German Patent Application No. 20 2015 107 075.6, filed Mar. 16, 2015, and German Patent Application No. 20 2015 107 072.1, filed Mar. 16, 2015, the disclosure of which are incorporated herein by reference in their entirety.

The invention relates to a brake system for a motor vehicle.

PRIOR ART

WO2006/111392A1 and WO2010/091883 A1 disclose brake systems in which, in ABS mode, the pressure in the wheel brakes is adjusted simultaneously or successively in a closed multiplex process. This takes place via a switching valve and via the position-regulated control of a driven piston for pressure build-up and pressure reduction taking into account the pressure-volume curve of each individual wheel brake. Preferably, switching valves with low flow resistance are used in connection to the wheel brake. The pressure can here be changed in one or more wheel brakes sequentially or simultaneously. For control, a pressure sensor is used which measures the pressure in the hydraulic connection between the piston-cylinder unit and wheel brakes.

The advantage of this method is a very precise pressure regulation, in particular with low friction coefficients and in recuperation. Also, the cost of the valves can be significantly reduced, since only one switching valve is required instead of one inlet and one outlet valve per wheel brake. The disadvantage with the brake systems known from these two documents is the high requirements for the electric motor. This must amongst others have a low inertia mass and a high torque for reversed operation.

DE 10 2012 002 791 A1 discloses a wheel brake, the basic structure of which with a master brake cylinder and isolating valves is known in the market as MKC1, see also DE 10 2013 224313 A1. Multiplex mode here is configured such that both the master brake cylinder and the pressure supply unit are connected to the brake circuits via respective isolating valves.

The advantage of this arrangement is the modular structure and the use of standard components (master brake cylinder), and the use of a separate pressure supply unit. In this arrangement, no differential pressures occur in the brake circuits since the pressure supply unit is connected to the brake circuits via isolating valves, and no differential pressures occur due to the interconnection of a piston for media separation.

The disadvantage however is the high cost of components. Amongst others, a large number of valves is required, with a complex master brake cylinder with two chambers and a simulator.

DE 102014117727 supplements the brake system described in DE 10 2012 002 791 A1 with a novel pressure supply unit which has a double-stroke piston operated in advance and return strokes, and in advance stroke has a different hydraulic cross-section area than in return stroke, and with which a controlled pressure reduction is possible.

The advantage of this configuration is the continuous delivery by the pressure-generating unit, and the motor-downsizing potential in conventional brake systems with inlet and outlet valves, by the use of a smaller hydraulic area. Because of the high dynamic requirements for motor torque for use in regulating mode, the advantage of downsizing cannot however be utilised and hence the brake system cannot be advantageously minimised.

Furthermore, various master brake cylinder designs with travel simulator are known from the prior art which are constructed with two pistons or three pistons and a travel simulator.

Advantageous designs of the master brake cylinder provide corresponding valve circuits for the travel simulator (shut-off in fall-back level, function valves, infeed on fall-back level), and isolating valves for the brake circuits for decoupling the pedal in brake-by-wire mode. Reference is made here merely as an example to DE 10 2010 081463 A1 and DE 10 2013 216477 A1. Further brake systems are known from DE 10 2015 103859.5 (MUX with two pistons), DE 102011102270 (three pistons), DE 10 2013216477 A1 (CAS, 3-piston system, auxiliary piston, push-rod piston, floating piston with partial MUX mode) and DE 10 2013224313.

The pressure regulating module described in this invention functions with all the above-mentioned designs for brake-by-wire master brake cylinders with travel simulator, and is therefore not explained in more detail below. Differences in the master brake cylinder design occur substantially because there are different customer preferences with regard to pedal feedback, and automotive suppliers wish to use standard components in the master brake cylinder, and certain designs require one or more isolating valves for the pressure supply unit.

DE10 2013 216477 A1 describes a three-piston THZ with valve circuit for the pressure supply unit and pressure regulation for ABS. In normal mode, the second pressure chamber is pressureless and the third is assigned to the SK piston. This locks in its starting position. The pressure regulation takes place in the HA circuit with MUX, and in the front axle circuit either with MUX or two additional outlet valves which, in $P_{ab}$ function, conduct the pressure medium to the storage container via an additional valve. Pressure regulation in multiplex mode does not take place via the volume measurement known from WO2006/111392A1, but via PWM of so-called wheel valves with constant pressure measurement by means of pressure sensors.

OBJECT OF THE INVENTION

The object of the present invention is to provide an economic brake system with high regulation quality and regulation performance.

Achieving the Object

The object of the invention may be achieved with a brake system with features according to various ones of the attached claims.

According to one aspect of the present application, a brake system for motor vehicles may include an actuation device, a travel simulator configured to generate a feedback force on the actuation device, at least two brake circuits, each respective brake circuit including at least two wheel brakes, wherein each respective one of the at least two brake circuits includes one respective outlet valve associated with one of the wheel brakes of the respective brake circuit or wherein only one outlet valve is associated with the at least two brake circuits, and wherein the outlet valve is, or the respective outlet valves are, arranged to couple the brake circuits to a pressure medium storage container only for pressure reduction, and with no further valve arranged between the outlet valve, or the respective outlet valves, and the pressure medium storage container, a first piston-cylinder unit, having at least one piston and at least one working chamber, wherein the at least one working chamber is coupled via at least one hydraulic connecting line to at least one of the wheel brakes of the brake circuits, at least one pressure supply unit comprising an electric motor, a piston arranged to be driven by the electric motor, and at least one working chamber, wherein the at least one pressure supply unit is able to simultaneously reduce brake pressure in two or more of the wheel brakes, respective switchable valves connected in respective hydraulic connecting lines coupled to respective wheel brakes of the brake system, wherein the respective switchable valves are open when unpowered, wherein the respective switchable valves are used in both pressure build up and pressure reduction in one or more of the respective wheel brakes, and wherein the respective switchable valves are arranged to conduct pressure medium between the respective wheel brakes and the first piston-cylinder unit, via the hydraulic connecting lines, and between the respective wheel brakes and the at least one pressure supply unit, a control device, coupled to control at least the switchable valves and the outlet valves, and at least one isolating valve, a respective one of the at least one isolating valve being disposed in a respective one of at least two further hydraulic connecting lines between at least one of the at least two brake circuits and the at least one pressure supply unit, wherein the at least one isolating valve isolates the at least one of the at least two brake circuits from the at least one pressure supply unit when closed, wherein each of the respective switchable valves includes an interior or armature housing, a first inlet/outlet port, and a second inlet/outlet port, wherein the second inlet/outlet port is a valve seat inlet/outlet port, wherein the interior or armature housing of each of the respective switchable valves is connected, through the respective first inlet/outlet port of the respective switchable valve, via a part of the respective hydraulic connecting line, to a pressure supply unit of the at least one pressure supply unit and to a brake circuit, and wherein the valve seat inlet/outlet ports of the all of the respective switchable valves are connected via respective parts of the respective hydraulic connecting lines to respective associated wheel brakes, and wherein the respective switchable valves are enabled to be opened both by return springs thereof and by pressure in the respective wheel brakes.

The brake system according to the invention is distinguished by a significant improvement in comparison with previously known brake systems with multiplex regulation, which are configured with 4 switching valves or 8-valve technology with inlet and outlet valves for ABS. The brake system according to the invention can advantageously be used universally in combination with different designs of master brake cylinder of a brake-by-wire system.

The brake system according to the invention is distinguished by a highly dynamic MUX mode and allows a great improvement in performance and great reduction in cost due to the minimal number of valves, wherein advantageously simple switching valves based on modified inlet valves may be used. Also, only a few pressure emitters/sensors are required. It is of particular advantage that only a small low-cost motor is required as a drive for the pressure supply unit.

The invention advantageously provides a pressure regulating module with pressure regulation which is distinguished by high pressure regulation quality, high dynamics thanks to short cycle time, particularly simple design of the low-flow switching valves with advantageous contact flow, a reduction in the requirements for the motor of the pressure supply unit, and minimal flow resistance.

This is achieved with a compactly constructed brake system which expands the advantages of a multiplexer in the form of high regulation quality in pressure regulation by pressure-volume control in various operating modes such as e.g. recuperation, ABS, ESP, ASR, by novel pressure reduction and pressure build-up regulation concepts which require few outlet valves to reduce the cycle time in the temporarily open brake circuit.

The requirements imposed are fulfilled according to the invention by operation in the closed and partially open brake circuit with minimal number of valves, and preferably an advantageous design of the pressure-generating unit with intelligent construction of the pressure-generating unit with a pressure piston delimiting only one working chamber, or a double-stroke piston which delimits two working chambers.

The following basic concepts form the background to the brake system according to the invention:
    pressure regulation in the closed and partially open brake circuit with minimal volume loss in ABS regulation mode;
    pressure build-up and pressure reduction with many degrees of freedom, high regulation quality and dynamics with switching valves and only one outlet valve in just one or both brake circuits;
    partially simultaneous pressure build-up and pressure reduction in the closed brake circuit using a double-stroke piston in the pressure supply unit;
    use of current measurement of the electric motor of the pressure supply unit for indirect pressure measurement, and use in particular in the pressure reduction and pressure build-up regulation in two brake circuits;
    more precise pressure-controlled pressure reduction by means of pressure measurement via pressure sensors via the pressure supply unit and valves which connect the pressure supply unit to the storage container (double-stroke piston with PD1, PD3 valve),
    novel design of the pressure supply unit in the embodiment as double-stroke piston with pre-fill effect, use of different hydraulic surface areas in particular on pressure build-up at high pressures;
    minimising of operation in the open brake circuit by preferably regulation in multiplex mode in the closed brake circuit.

In the brake system according to the invention, evidently not all the above-mentioned ideas need be implemented, but it is essential that only a maximum of one outlet valve is provided per brake circuit, and one switching valve per wheel brake for pressure build-up and pressure reduction, whereby advantageously the number of necessary valves is less than the eight which are required with a conventional ABS system.

The brake system according to the invention also has a novel intelligent multiplex method which provides a largely simultaneous pressure reduction in several wheel brakes via time control of the outlet valve or valves, and optionally allows also simultaneous pressure reduction and pressure build-up in different brake circuits.

The invention is based on the concept that in normal operation with low dynamic requirements and high pressure-setting precision requirement, in particular with normal brake force amplification, recuperation, ABS at low μ, in all wheel brakes or wheel brake cylinders, the pressure is built up and reduced simultaneously or sequentially via travel control of the piston of the pressure supply unit, taking into account the pressure-volume curve(s). Here no PWM control of the switching valves is used, or a simplified valve circuit. Instead, the switching valves assigned to the wheel brakes on pressure setting are always open for the entire time and closed after reaching the desired or predefined nominal pressure, in order to maintain the brake pressure in the wheel brakes. In operating situations with high dynamic requirements such as e.g. ABS at high μ, μ split, ESP and ASR, the pressure in principle is always built up in all wheel brake cylinders with pressure-volume control in multiplex mode, i.e. simultaneously or sequentially. Here again, there is no PWM control of the switching valves, but the pressure is reduced in some of the wheel brakes in multiplex mode simultaneously or sequentially, while in the one or both wheel brakes the pressure is transferred to the storage container via the respective assigned outlet valve, wherein the respective outlet valve is opened only for a predefined time so that during this time, the pressure in the wheel brake can fall to the nominal pressure. Also, the pressure reduction can take place via a working chamber of the pressure supply unit, and from there via a switching valve to the storage container. The switching valve is also time-controlled so that in the predefined time in which the valve is open, the pressure can fall to the nominal pressure. The pressure reduction in the other wheel brakes may take place at the same time via the volume control by means of the piston of the pressure supply unit.

The pressure fall regulation in multiplex mode in the closed brake circuit is extended in comparison with the prior art in that, on simultaneous pressure reduction in two wheel brakes, the switching valves SV are open simultaneously or with a temporal offset, wherein the switching valve of the wheel with the higher pressure is opened early.

The pressure is reduced in the open brake circuit preferably by time control of the outlet valves to the storage container. By pressure reduction via outlet valves, the brake circuit is opened for a short-time.

Thanks to the above extensions, the load on the multiplexer or the pressure supply unit can be greatly reduced and at the same time the regulation quality increased thanks to shorter cycle times.

Thus, the pressure in one brake circuit can be reduced rapidly in that the pressure is reduced by opening the outlet valve of the one wheel brake, and at the same time the pressure in the other wheel brake of the brake circuit is reduced by means of the pressure supply unit. In a conventional multiplexer without corresponding outlet valve, the pressure reduction in the two wheel brakes of a brake circuit would have to take place temporally successively, and thus take at least twice as long.

Also, advantageously the outlet valve can be used for the pressure reduction in both wheel brakes of the brake circuit if both the outlet valve and the two switching valves assigned to the wheel brakes are opened in multiplex mode.

Advantageously, only one outlet valve is used in a brake circuit, in particular to simplify the regulation in brake circuit II. Thus, one outlet valve (AV3, FIG. 1b) is used to reduce the pressure in one or two wheel brake cylinders. For reduction in two wheel brakes via one outlet valve, the wheel brake cylinder is isolated from the pressure supply unit. At the same time, the pressure in brake circuit BK I and BK II can be built up or reduced simultaneously or sequentially by pressure-volume control of the wheel brakes. This degree of freedom leads to a significant reduction in the cycle time of the pressurisation of four wheel brakes, and has a highly advantageous effect on the regulation quality (deviation of wheel speeds from vehicle speed) in particular in extreme situations, e.g. changing μ, in particular in the high μ range, and leads to shorter braking distances. Also, the volume loss in the brake circuit is minimised because in regulation mode, only very little volume is lost. This has advantageous effects on a small dimensioning of the volume of the pressure supply unit.

The proposed full MUX systems of the prior art are known to have the problem of simultaneous pressure fall $P_{ab}$ when the pressure level in the wheel brakes differs greatly. Many use the volume control to control the pressure by using the pressure-volume curve of the wheels/wheel cylinders. The time loss on pressure fall $p_{ab}$ of the wheel/wheel brakes, in particular on the front axle, should however be as low as possible. The switching times of the known MUX systems however cause a significant time shift due to the switching time required in multiplex mode. Because of the high brake force proportion on the front axle (V), this is particularly susceptible to good regulation, which means that the wheels must always be operated with high dynamics and almost optimal brake pressure close to the slip optimum. The brake system according to the invention meets these demands particularly well if the high dynamic regulation strategy described above with volume and time control is used.

Furthermore, a (minor) disadvantage with the previously known brake systems described above is that no pressure build-up $p_{auf}$ can take place if one wheel required a pressure fall $p_{ab}$. As an alternative to full MUX, partial MUX systems are proposed in which one BK is designed with MUX and the other BK with conventional inlet and outlet valves.

One essential disadvantage of the outlet valves (AV valves) is the poorer precision of the pressure control, pressure fluctuations and noise formation. With the regulation strategy described above, primarily the quiet volume-controlled multiplex mode is used. The outlet valves are not required continuously and are used relatively rarely.

This is achieved by priority control of the multiplexer with first priority for the front axle and additional use of the outlet valve AV in unchoked return to the storage container. For the rear axle, the pressure reduction $p_{ab}$ takes place with second priority in the multiplexer. Alternatively, a pressure fall $p_{ab}$ may take place on the rear axle with precise time control of the switching valves, whereby only a slight time delay occurs.

Throughout the entire regulation process, at the start of the pressure reduction, the pressure in all wheels is stored so that the MUX control system of the pressure supply unit (DE) can immediately switch to optimal control pressure. Precise time control of the outlet valves, in comparison with the prior art, is possible because the pressure difference is known, and from the pressure-volume curve the volume and hence the throughflow quantity for time control of the outlet valve or a switching valve can be determined. Pressure fluctuations towards the end of the pressure change can also be reduced by supporting the pressure reduction with a corresponding piston control of the pressure supply unit.

The temporal sequence of the method is shown and explained later in detail in the figures.

The term volume control according to the invention means that the control device evaluates the current pressure levels, the pressure-volume curves and the target nominal pressures for the respective wheel brakes, and using these data calculates the necessary delivery volume which must be supplied by the pressure supply unit. From this delivery volume, the necessary movement travel of the piston of the pressure supply unit can be determined. With corresponding valve circuits and design of the pressure supply unit, it is possible to implement a pressure build-up $P_{auf}$ in one brake circuit and at the same time a pressure reduction $p_{ab}$ in another brake circuit.

Previously, the valves required for multiplex operation were more costly because of the requirements for differential pressure and flow cross-section due to the large dimensioning of the magnet circuit. By corresponding supply to the magnetic valve from the brake circuit into the armature chamber, and then via the valve seat to the wheel cylinder, with the brake system according to the invention, advantageously, a low-cost standard magnetic valve can be used.

To support the regulation, a pressure sensor is used to determine the pressure in one brake circuit. The pressure in the other brake circuit can be determined indirectly on separation by an isolating valve, using the known method of phase current measurement of the electric motor. The accuracy of the pressure estimate is increased further if a temperature sensor is arranged in the electric motor driving the piston, since the torque constant changes proportionally to the temperature. With the known cross-section area of the master brake cylinder and gear reduction, the pressure can be calculated by the proportional correlation between the phase current and torque of the electric motor.

An advantageous feature of the brake system according to the invention is the use of a double-stroke piston with which the pressure can be built up and reduced in multiplex mode. It is also advantageous if a further valve (TV2$b$, or ZAV) is available for pressure reduction in the second chamber (4$a$, FIG. 5) of the double-stroke piston. In particular with the double-stroke piston, the use of one or more pressure reduction valves (PD3, PD1 FIGS. 5$a$-5$d$, FIG. 6) is useful, so that the pressure in the brake system can be largely reduced in closed mode and pressure reduction can take place with low noise even at high pressures. This is desirable in particular in brake servo mode with fading and pressure reduction when stationary after ABS intervention.

The pressure is then reduced either via the piston return stroke, the pressure-regulated pressure fall by means of pressure measurement via the pressure sensor for the pressure supply unit, and/or via valves which connect the pressure supply unit (double-stroke piston) to the storage container (i.e. PD3, PD1). The pressure sensor in brake circuit BK II is used to regulate the pressure reduction in both brake circuits. If the pressure is to be reduced individually in brake circuits I and II, in addition the pressure estimate based on the phase current measurement is used. The pressure reduction can here take place via one chamber 4 of the piston or both chambers 4 and 4$a$.

In normal brake servo mode, the pressure is reduced via the piston return stroke to pressures close to the blocking pressure, the pressure fall via PD3, PD1 on pressure reduction from high pressures, in particular after fading or at the end of ABS control processes.

The double-stroke piston in the pressure supply unit may be configured such that the hydraulic surface areas in the advance and return strokes are different. By changing the hydraulically active areas, the torque requirement at high pressures is reduced. At the same time, a pre-fill effect can be achieved, i.e. by a larger volume flow at low pressures, a very rapid brake application can be achieved or a pad clearance overcome.

The small hydraulically active area is effective because the double-stroke piston is operated in return stroke, or additionally, in advance stroke, the front and rear chambers of the double-stroke piston are connected via a changeover valve (ShV) or two valves (TV2 and TV2$b$), and hence a small hydraulic area acts in pressure build-up. If the double-stroke piston is retracted, by opening a pressure reduction valve PD1, the pressure in both brake circuits can be dissipated into the storage container. Thus low-noise operation in closed brake circuit is possible. By intelligent activation, the opening of the isolation valve can be supported even at high differential pressures (brake circuit pressure to pressure in the double-stroke piston) if the double-stroke piston changes the pressure in the working chamber before opening of the valve, and allows opening at low differential pressures. This allows a downsizing of the isolating valve, in particular its design for high throughflow and low differential pressures.

The pressure reduction then takes place either via the piston return stroke (PD1 open) via pressure-volume control and if necessary opening of outlet valves in brake circuit II and pressure reduction via TV2$b$ (ZAV). For noise reduction, an outlet valve can be opened time-controlled for this operating point and the pressure fall influenced by the piston, so that pressure fluctuations are avoided and a gentle swing towards the target pressure level is achieved. This may be used effectively in particular on pressure fall via ZAV.

In the return stroke with valve PD1 closed, pressure can only be built up or the volume of one brake circuit shifted to the other. This pressure build-up is preferably used only if the pressure must be raised significantly above the normal operating level, such as e.g. on fading >120 bar.

Also, pressure can be reduced in one brake circuit in one or two wheel brake cylinders, and at the same time pressure built up in the other brake circuit with the pressure-volume control method as depicted in FIG. 5$b$. The pressure is regulated via the correspondingly adapted pressure-volume curve, which takes account of volumes of the activated wheel brakes and the hydraulically active area. When the target pressure is reached, the associated valve is closed and the volume of the wheel brake still active is reduced via PD1. At the same time, a pressure reduction is possible via an outlet valve.

In the system, preferably MUX regulation is used, i.e. pressure control via the pressure-volume curve with closed brake circuit (FIGS. 2$a$-2$b$). Thus, in the closed brake circuit, the pressure can be built up and reduced on the basis of the pressure-volume curve. This takes place mainly with brake force amplification, recuperation, ABS mode in low frequencies and pressure amplitudes. In other operating cases, e.g. controlled pressure fall after ABS operation, simultaneous pressure build-up and pressure reduction at high frequencies, the pressure can be influenced in pressure reduction in addition to time control of the outlet valves, if necessary supported by plunger travel control (FIG. 6$b$).

After the pressure reduction on opening of the brake circuit, there is always a volume loss in the brake circuit and hence a change in travel in the piston position of the pressure-generating unit. Therefore, it is useful to detect the offset shift $\Delta s_o$ of the pressure-volume curve (FIG. 2b). This is not necessary for MUX regulation, but for regulation and optimising of the volume balance in order to prevent the piston from travelling to a stop on a regulation process. In particular on use of a double-stroke piston with limited volume in one stroke direction, information on the absolute position of the piston is important for regulation.

This proposed control with outlet valve(s) and pressure reduction $p_{ab}$ time control substantially relieves the load on the motor dynamics. The rare use of the outlet valve brings the advantages that the ABS pressure modulation does not necessitate opening of the brake circuit, which lowers the probability of a brake circuit failure and entails particular advantages for autonomous driving/braking.

The pressure regulation module with pressure regulation and its various embodiments thus offers a module for perfect pressure regulation without restriction and high safety on faults. The disadvantages of the conventional multiplexer— e.g. long cycle time from sequential wheel operation, no possibility of simultaneous pressure build-up and reduction, high requirements for electric motor dynamics—are thus eliminated and form the basis for an almost perfect regulation with minimum valve complexity. Depending on choice of pressure supply unit (single-stroke piston or double-stroke piston), different degrees of freedom are possible. The single-stroke piston has the advantage of low software complexity; the double-stroke piston offers all degrees of freedom and motor-downsizing potential. Also, independently of the choice of pressure supply unit, the requirements for motor torque for reversed operation of the multiplex regulator are drastically reduced and the size and cost of the electric motor can be significantly reduced.

A further improvement in the system layout advantageously results from infeed of the volume of the pressure supply unit via a blow hole into the front side of the floating piston. This also advantageously increases safety with simultaneously reduced cost. With this system layout, the isolating valve TV1 may be omitted since the pressure supply unit is isolated via movement of the piston on system failure. This offers cost advantages (fewer valves) and reduces the flow resistance between the pressure supply unit and the first brake circuit (BK1).

DESCRIPTION OF THE DRAWINGS

FIG. 1c: shows pressure regulation options in the basic system of FIG. 1a;

FIG. 4: shows temporal development of an exemplary regulation with 4 wheel brakes;

FIG. 4a shows temporal development of an exemplary regulation with 4 wheel brakes;

FIG. 4b: shows temporal development of an exemplary regulation with 4 wheel brakes;

DESCRIPTION OF THE FIGURES

Figure 1A:
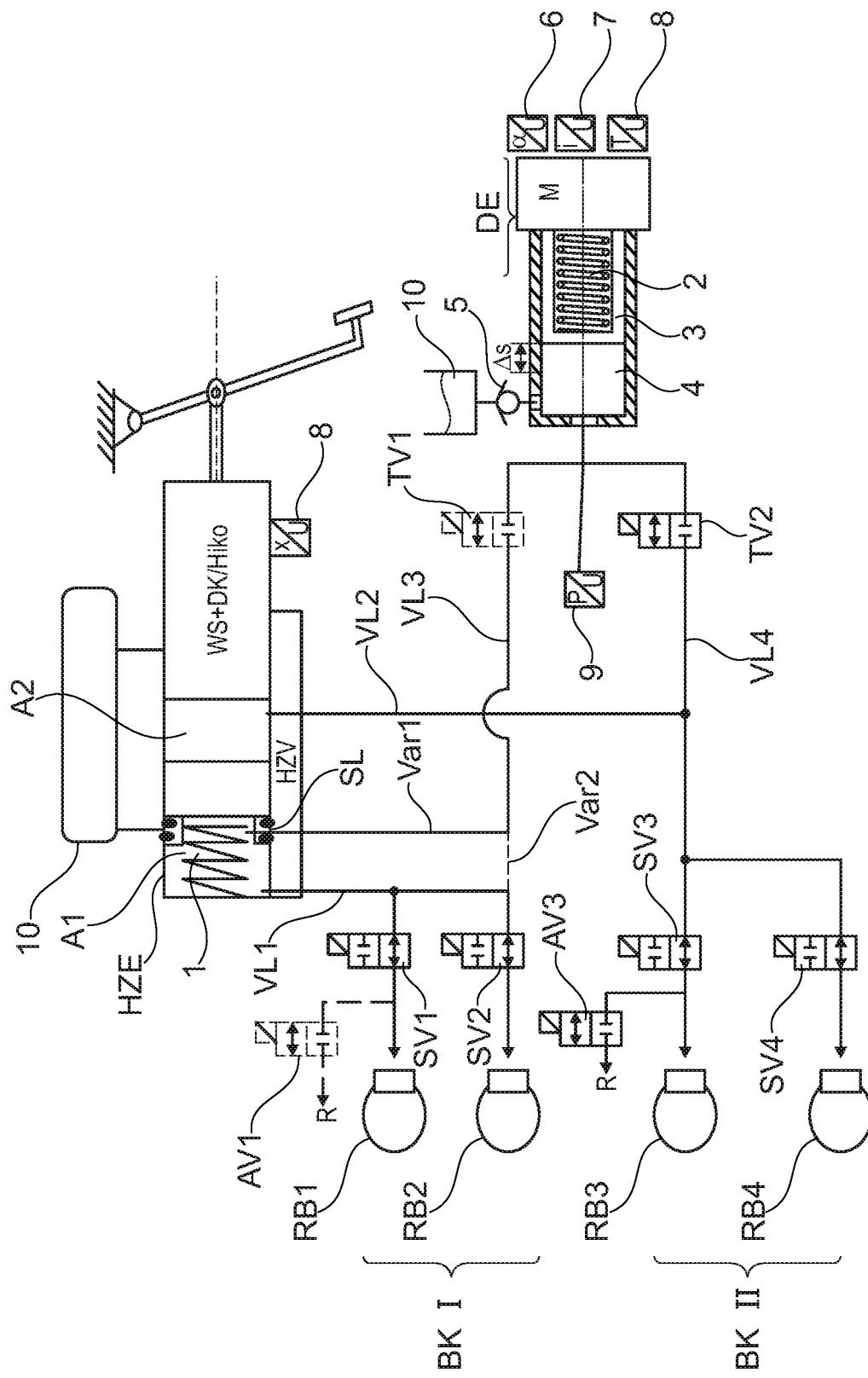
FIG. 1a: shows a first possible embodiment of the brake system according to the invention with master brake cylinder, pressure supply with outlet valve(s) in one or two brake circuits.

FIG. 1a describes the basic embodiment of the brake system according to the invention with master brake cylinder HZE, pressure supply unit DE with single-stroke piston (3) and outlet valve(s) AV1, AV3 in one or optionally two brake circuits. Brake circuit II is advantageously assigned to the front axle. The outlet valve AV1 is optional, i.e. need not necessarily be provided.

The brake system consists of a master brake cylinder according to the prior art, comprising a master brake cylinder unit HZE, floating piston SK with return spring 1, a pressure piston DK or ram or an auxiliary piston HiKo, a hydraulically actuated travel simulator WS and corresponding control valves HZV for the function of the piston-cylinder unit, as described for example in the prior art.

The following embodiments amongst others are possible:
a) master brake cylinder with two pistons in the form of a pressure piston DK and a floating piston SK with connected travel simulator which can be shut off via a valve,
b) 3-piston system with auxiliary piston HS for travel simulator actuation and infeed valve and/or mechanical intervention in the event of a fault,
c) 2-piston system with floating piston SK and auxiliary piston HiKo with infeed.

In all embodiments, the master brake cylinder unit HZE can be isolated from the pressure supply unit DE. According to variant Var2, this can be achieved via isolating valves TV1 and TV2, or in the second variant Van shown, via blocking of the supply of the floating piston. The valve circuit of the HZE ensures that no undesirable feedback occurs to the pedal BP when the pressure supply unit DE is active, and in fall-back level (system failure) the volume of the master brake cylinder unit HZE is guided to the wheel brakes RB1-4. Also, a switching valve SV1-4 is arranged for each wheel brake in the hydraulic connection to the respective associated working chamber A1 or A2 of the brake master cylinder HZE. The concrete embodiment of the master brake cylinder HZE is not however relevant for the brake system according to the invention.

The brake system has four switching valves SV1, SV2, SV3 and SV4, via which the pressure supply DE and the master brake cylinder HZE are connected to the wheel brakes RB1-4. The switching valves SV1-4 preferably have a low flow resistance and are suitable for MUX operation. In addition, an outlet valve AV3 is provided in a brake circuit for pressure reduction in the wheel brake in RB3 independently of the MUX, and is arranged in the hydraulic connection between the wheel brake RB3 and the storage container 10. Preferably, the outlet valve AV3 is positioned on the front wheel brake RB3 of a brake circuit since, in extreme cases, the pressure in this wheel brake must be reduced quickly and without great time delay because the significant braking effect originates from the front axle.

The pressure supply unit DE consists of an electric motor M, which via a spindle 2 drives a piston 3 which compresses or shifts the volume in the pressure chamber 4. The motor M of the pressure supply unit may comprise two or three sensors: a) angle sensor 6, b) current measurement sensor for measuring the phase currents of the electric motor 7, and c) if necessary, a temperature sensor 8 for determining the coil temperature of the electric motor M.

The pressure-generating unit DE is preferably arranged in the valve block or HZE. The pressure chamber 4 of the pressure-generating unit DE is connected to a storage container 10 via a check valve 5. A pressure sensor 9 is arranged at the outlet of the pressure-generating unit DE. The brake circuit II is connected via the isolating valve TV2, and brake circuit I via the isolating valve TV1, to the pressure supply unit DE. The isolating valve TV1 may be omitted if one chamber is separated by the pressure supply unit DE in fall-back level. This can be achieved by a pressure infeed from the pressure-generating unit DE via the blow hole SL of the floating piston SK.

For pressure modulation in ABS and recuperation, the control device and its regulator determine the necessary pressure change for pressure build-up (referred to below as $P_{auf}$) and pressure reduction (referred to below as $P_{ab}$). The pressure is regulated by the pressure-generating unit DE, in that simultaneously or with a temporal offset, the individual wheels/wheel cylinders are supplied with pressure. For this, the electric motor M shifts the corresponding volume for pressure change in both directions via e.g. the piston 3.

Here, the pressure change according to the prior art can be modified by corresponding time control with PMW of the switching valves and pressure control of the pressure of the DE. This however requires a very precise PWM process with complex pressure model. Preferably, therefore, the volume control is used as already described above. For this, the data of the pressure-volume curve (p-V curve—see FIGS. 1a and 2a) of the respective wheel brake RB1-4 involved in the pressure build-up or reduction are stored in the memory of the regulator unit. If now the regulator requests a pressure change Δp, for pressure regulation at the wheel the differential volume ΔV is adjusted accordingly by the piston in both directions ±ΔS. For this, one or more switching valves are opened which are closed again after completion of the volume shift. The position of the piston 3, e.g. at the start, middle or end of the stroke, is irrelevant for ΔP volume control for the regulation. Here, during the pressure change, a temporal control may be used in order to implement transition functions towards the end of the pressure change, e.g. to reduce the pressure fluctuations and the associated noise.

A high dynamic is important if two or more wheels require a pressure change simultaneously. For this, the invention proposes that to relieve the load on the motor dynamics, one or two additional outlet valves AV are used. For volume control, in particular also the pressure level in the pressure-generating unit DE and in the wheels is important. It is favourable here that the pressure level on pressure change corresponds to the starting pressure of the wheel to be regulated. This achieves a rapid and low-noise pressure regulation. The temporal developments are illustrated in FIGS. 3, 3a, 3b and 4, 4a, 4b.

Suitable pressure-generating units DE are all pumps with single piston, stepped piston, double-stroke piston and also e.g. gear pumps which allow precise volume control.

In FIG. 1a, for the above-mentioned functions, the pressure generation takes place in one circuit directly via an isolating valve TV1 in BK1 (Var2) or alternatively via a blow hole SL on the front of the SK piston (Var1). The pressure is supplied to brake circuit BK2 via an isolating valve TV2. For infeed via the blow hole SL on the front of the floating piston SK, optionally the isolating valve TV1 may be omitted since, on system failure, the pressure-generating unit DE is isolated from the master brake cylinder effect because piston SK moves and shuts off the pressure supply DE. Alternatively, as drawn in dotted lines, the pressure-generating unit DE may be connected directly to BK1 via TV1 (Var2). Since the SK piston in Var1 is only moved in fall-back level, a special diagnosis circuit is required in which the floating piston SK is moved and checked for tightness.

Figure 1B:
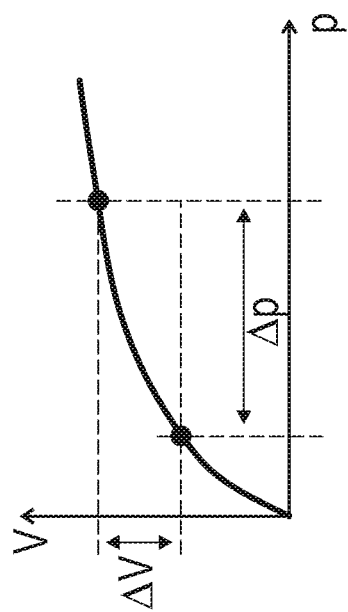
FIG. 1b: shows an example of a simplified pressure-volume curve.

FIG. 1b describes the known pressure control based on a simplified pressure-volume curve which forms the basis of the MUX regulation. Depending on the required pressure difference Op, from the curve a volume change ΔV is read which is implemented as a travel change Δs of the piston 3 by shifting the plunger of the pressure-generating unit DE. This applies for both pressure build-up and pressure reduction.

Figure 1C:
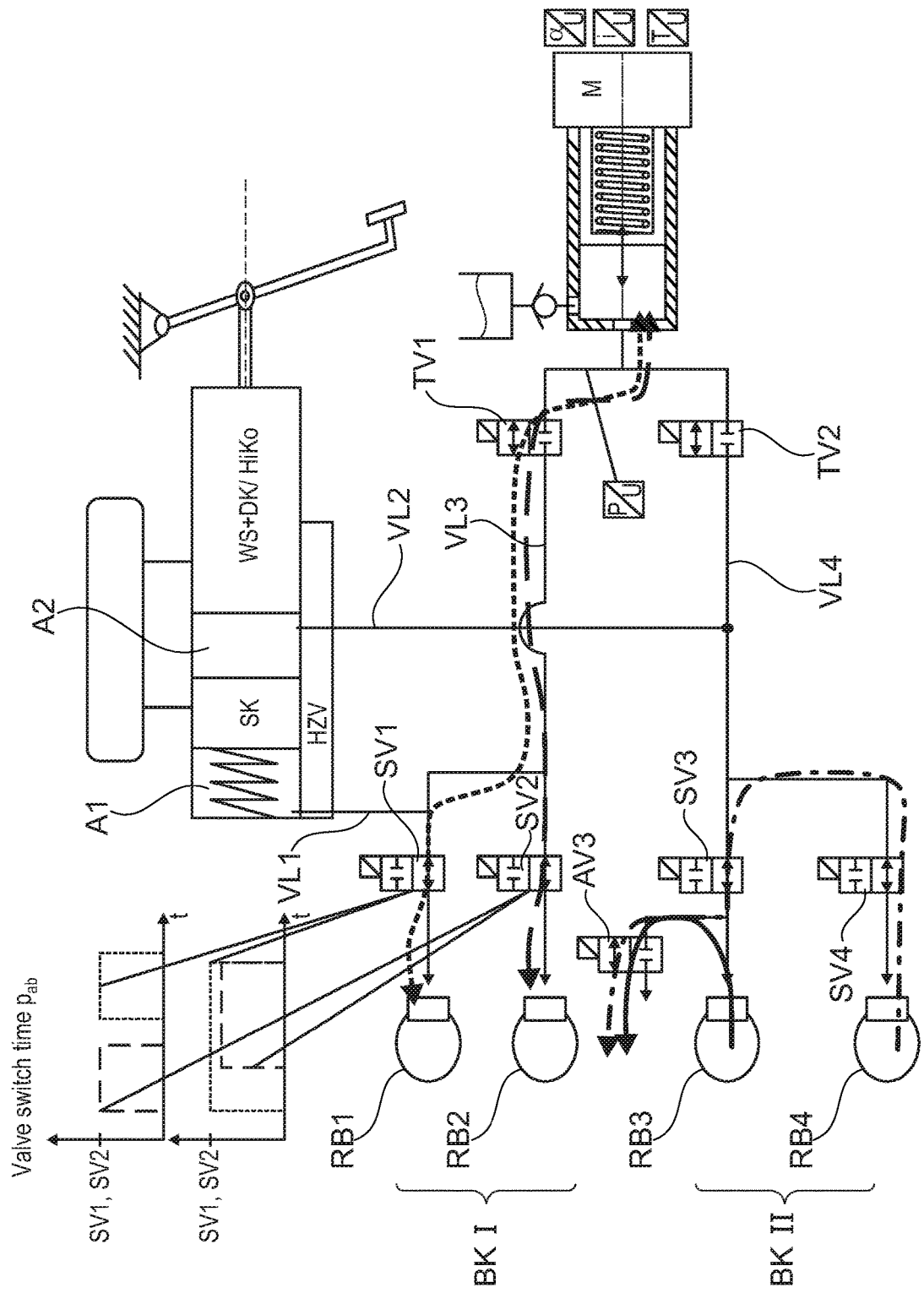

FIG. 1c shows a fundamental possibility for pressure regulation in the basic embodiment of FIG. 1. The system itself has the following degrees of freedom in pressure regulation:

pressure build-up and pressure reduction in all brake circuits BKI and BKII mainly with multiplex regulation (pressure regulation with pressure-volume control) in all wheel brake cylinders simultaneously or sequentially;

multiplex regulation in pressure build-up and pressure reduction in brake circuit I via the opened isolating valve TV1 and simultaneous pressure reduction in brake circuit II via the outlet valve AV3;

multiplex regulation via SV1, SV2, SV4 in pressure build-up and pressure reduction in brake circuit I and II for wheel brakes RB1, RB2 and RB4, and simultaneous pressure reduction in wheel brake RB3 via opened outlet valve AV3 with closed switching valve SV3.

The pressure reduction $p_{ab}$ via switching valves SV1 and SV2 in BK I takes place mainly via pressure-volume control, sequentially or simultaneously. For this, the respective switching valve SVi is always opened. For simultaneous pressure reduction $p_{ab}$ at different starting pressures, optionally by deviation from the MUX regulation, switching valves SV1 and SV2 may be opened with a time offset, and pressure reduction $p_{ab}$ controlled via a switching valve SV2.

The isolating valve TV1 is always opened on pressure reduction. In this exemplary embodiment, the wheel brake RB1 has a higher pressure, therefore the associated switching valve SV1 is opened before the switching valve SV2. On the basis of knowledge of the pressure difference—the pressures in wheel brakes RB1 and RB2 and the pressure in the pressure-generating unit DE are known—the time control may be dimensioned precisely. SV2 is opened when the pressure in the pressure-generating unit DE is approximately reached. Further pressure reduction then takes place simultaneously in both wheel brake cylinders RB1 and RB2 by control via piston 3 when switching valves SV1, SV2 and TV1 are open. When the target pressure of a wheel is reached, the corresponding switching valve SV1 or SV2 is closed. If further pressure reduction is desired in one wheel, the further pressure reduction can take place in the respective wheel brake.

As already described, to simplify the system, preferably the PWM control is omitted, in particular also for noise reduction.

Exemplary temporal curves of the pressure reduction are described in FIGS. 4a to 4c.

Figure 1E:
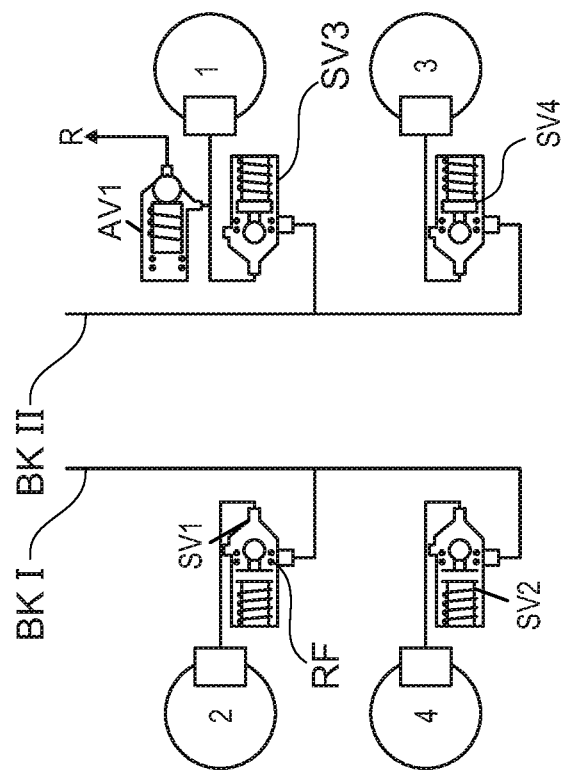
FIG. 1e: shows advantageous valve circuit for new regulation system with switching valves and an outlet valve in one brake circuit.
Figure 1D:
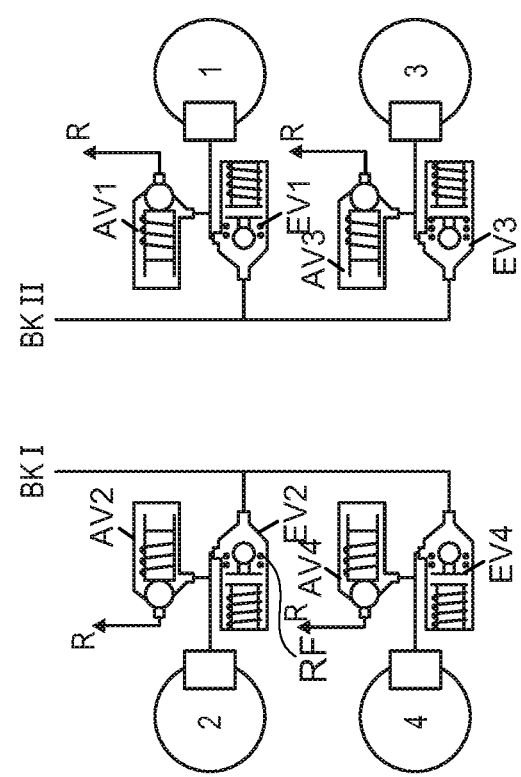
FIG. 1d: shows valve circuit with AV/EV in the regulation systems of the prior art.

FIG. 1d shows a conventional valve circuit for ABS with four inlet valves EV and four outlet valves AV. If this is also used with fewer AV for MUX, e.g. with differential pressure in MUX, as well as this pressure the fault case must be taken into account in which, on an asymmetric road surface, the pressure-generating unit and also the valve actuation fail suddenly e.g. due to the ECU, and at the same time the pressure-generating unit has a low pressure level. In this case for example, EV1 has 130 bar and EV2 0 bar. On failure of the pressure-generating unit, this means that for EV1 the return spring of the valve armature must open around 130 bar. To enable this, the magnet circuit of the valve must be sufficiently large, whereby the valve becomes costly. Alternatively, a pressure-relieved valve may be used, but its costs are also high.

In dimensioning of the valve seat, it must also be taken into account that this should be as large as possible in order to generate a small backup pressure if the brake pressure is to be built up rapidly by the pressure-generating unit. The backup pressure is introduced directly into the motor torque or power.

FIG. 1e shows a modified throughflow of the switching valves SV. The hydraulic medium flows from the brake circuit or pressure-generating unit through the armature chamber to the valve seat and onto the wheel cylinder. If the above fault case occurs, the wheel pressure opens the switching valve. The magnetic force must however also close around 130 bar, which takes place however with a small armature air gap in the valve end position. The return spring of the switching valve SV need therefore only be slightly strengthened so that the switching valve does not "snatch" at correspondingly high volume flow. Since conventional inlet valves must close at around 220 bar—in FIG. 1e, 130 bar—, with the same magnet dimensioning the valve seat area may be increased which means a smaller backup pressure or flow resistance and is advantageous for MUX mode. The valve circuit depicted in FIG. 1e is therefore advantageous for the brake system according to the invention.

Figure 1F:
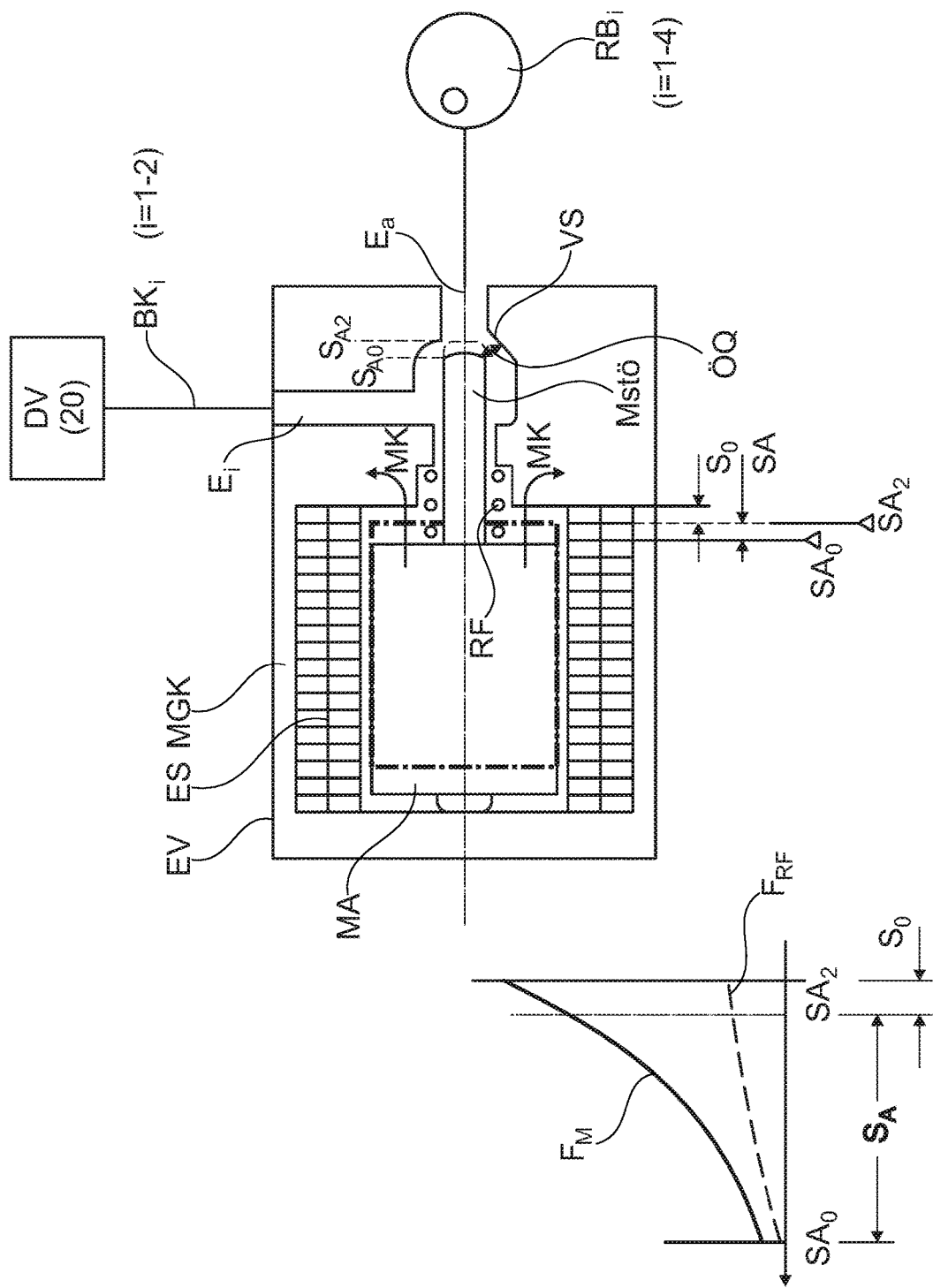
FIG. 1f: shows inlet valve according to the invention in the brake circuit.

FIG. 1f shows a possible embodiment of the inlet valve EV according to the invention and the connection to the brake circuit BK and the pressure supply DV and wheel brakes RBi.

The inlet valve EV has a magnet armature MA, a magnetic base body MKG and an exciter coil ES. When the magnetic valve EV is powered, the magnet force MK shifts the armature MA from position $S_{40}$ to position $S_{42}$ by the differential travel $S_A$. The magnet armature MA moves a ram MStö by the same travel, so that the ram MStö comes to rest on the valve seat VS and closes the outlet Ea of the magnetic valve. The armature MA at this point still has a residual air gap $S_0$ from the magnetic base body MKG, which is provided so that the armature MA does not stick to the magnetic housing MGK when the power to the exciter coil ES of the valve EV is switched off, due to re-magnetisation losses of the iron circuit. When the valve current is switched off, the return spring RF moves the armature MA back to the starting position. The magnet force $F_M$ rises nonlinearly with a smaller air gap, e.g. with increasing travel. The return spring $F_{RF}$ is dimensioned such that the magnetic force $F_M$ in the starting position $S_{40}$ is greater than the spring force, so that a secure closure of the valve is guaranteed. The spring force increases with the increasing travel $S_A$ and in the end position $S_{42}$ is however smaller than the magnet force $F_M$. Preferably, a linear spring is used, so that the magnet force $F_M$ in the end position for a given current is significantly higher than the return force, so that the valve can be retained with low current, or secure closure is guaranteed even at high differential pressures between the wheel brake and the pressure supply. This retention is also ensured at high differential pressures since the magnet force increases strongly nonlinearly at the closed valve position. The return spring must however also be dimensioned such that the function as an unpowered open valve can be ensured and the valve always opens safely.

The outlet Ea of the valve is connected to the wheel brakes RBi (RB1-RB4), the inlet E, to one brake circuit BKi or to the pressure supply unit DV (20). With such connections, the inlet valve EV can be opened both by the return spring RF and by the pressure in the wheel brake, which is very important in particular in the event of a fault or malfunction in the brake system (e.g. loss of voltage to the valve). Also, even at high pressures in the brake circuit and small pressures in the wheel brake, only the pressure difference between inlet Ei and outlet Ea acts on the ram MStö. This differential pressure at the valve is relatively low in pressure build-up, but must however be taken into account in the spring design RF so that the pressure difference does not lead to the valve being pushed back on pressure build-up when the volume of the pressure supply DV is delivered to the wheel brake. Valves with large opening cross-section ÖQ or low flow losses reduce this effect.

In particular on pressure build-up with pressure-volume control or time control with low differential pressure between the pre-pressure and actual pressure in the wheel brake, the valves described above with large opening cross-section may be used since the regulation accuracy is very high. This in turn has advantages in that only low flow losses occur, in particular with rapid pressure build-up (TTL), and the drive motor requires only a low power for rapid pressure build-up in a very short time (TTL=150 ms).

Also, because of the low flow losses of the advantageously configured inlet valves, a pressure reduction can take place quickly via the inlet valves. Precise pressure reduction via the inlet valves EV can take place with corresponding control of the piston movement of the pressure supply unit 20. Optionally, it is also possible to implement the known MUX process with the valve circuit described above, or with pressure reduction control via outlet valves AV in one brake circuit, in particular for consumers with low volume balance, e.g. the wheel brakes on the rear axle. In other words, a combination is also possible which uses the MUX process in connection with the new valve circuit only in two wheel brakes (e.g. front axle), and the pressure reduction takes place conventionally on two further wheel brakes. This would mean that two wheel brakes/actuators are provided with inlet and outlet valves (EV+AV) and two wheel brakes/actuators only with inlet or switching valves EV. In this case, only the wheel brakes of the front axle are equipped with the new valve circuit according to the invention as shown in FIGS. 1a and 1b, and a standard circuit/standard valves are used on the rear axle.

Figure 2A:
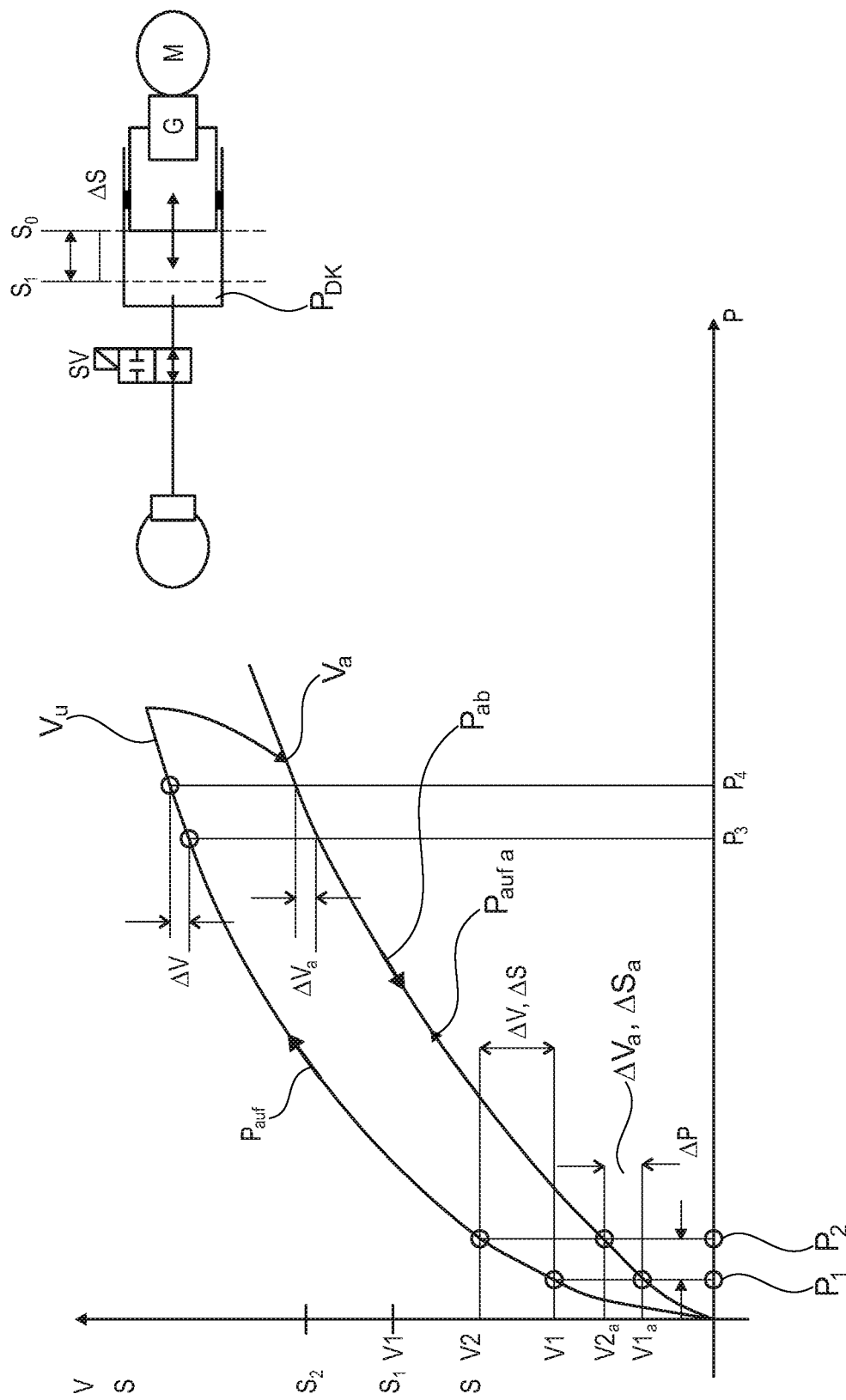
FIG. 2a: shows pressure-volume control in a closed brake circuit (AV, ZAV closed)

FIG. 2a shows the pressure-volume curve of the wheel/wheel cylinder with connecting lines as far as the switching valve SV and pressure sensor. Two curves are shown. Curve $P_{aufa}$ corresponds to a so-called stiff curve, the other curve $P_{auf}$ requires substantially more volume. This may in extreme cases cause vapour bubbles due to e.g. play or poor purging.

This means that the values for $V_a$ e.g. for $\Delta P = P_1 - P_2$ are equal to $V_1 - V_2 = \Delta V_a = \Delta S_a$ and at $V_{auf} = \Delta p$ equal to $V_{1a} - V_{2a} = \Delta V = \Delta S$. This curve for $p_{auf}$ and $p_{ab}$ is stored e.g. for the first time on line-end tests in the memory of the control device both for the individual wheel brakes and for the brake circuits for both $p_{auf}$ and $p_{ab}$. On each braking, the curve is measured by comparison of pressure P with the volume $V_{(\Delta S)}$. If a great deviation occurs, with a stationary vehicle, the curves can be recorded or adapted as in the above-mentioned test. It is also significant that the values can fluctuate between $P_{auf}$ and $P_{ab}$. It is normal that due to play, $V_0$ is greater on pressure build-up $P_{auf}$ but not on pressure reduction $P_{ab}$. When the play has been eliminated, the curves are almost equal.

With poor purging or vapour bubbles, the curves behave similarly but with greater volume for the corresponding pressure value.

For regulation, the p-V curves are used for pressure build-up $p_{auf}$ and pressure reduction $p_{ab}$.

Figure 2B:
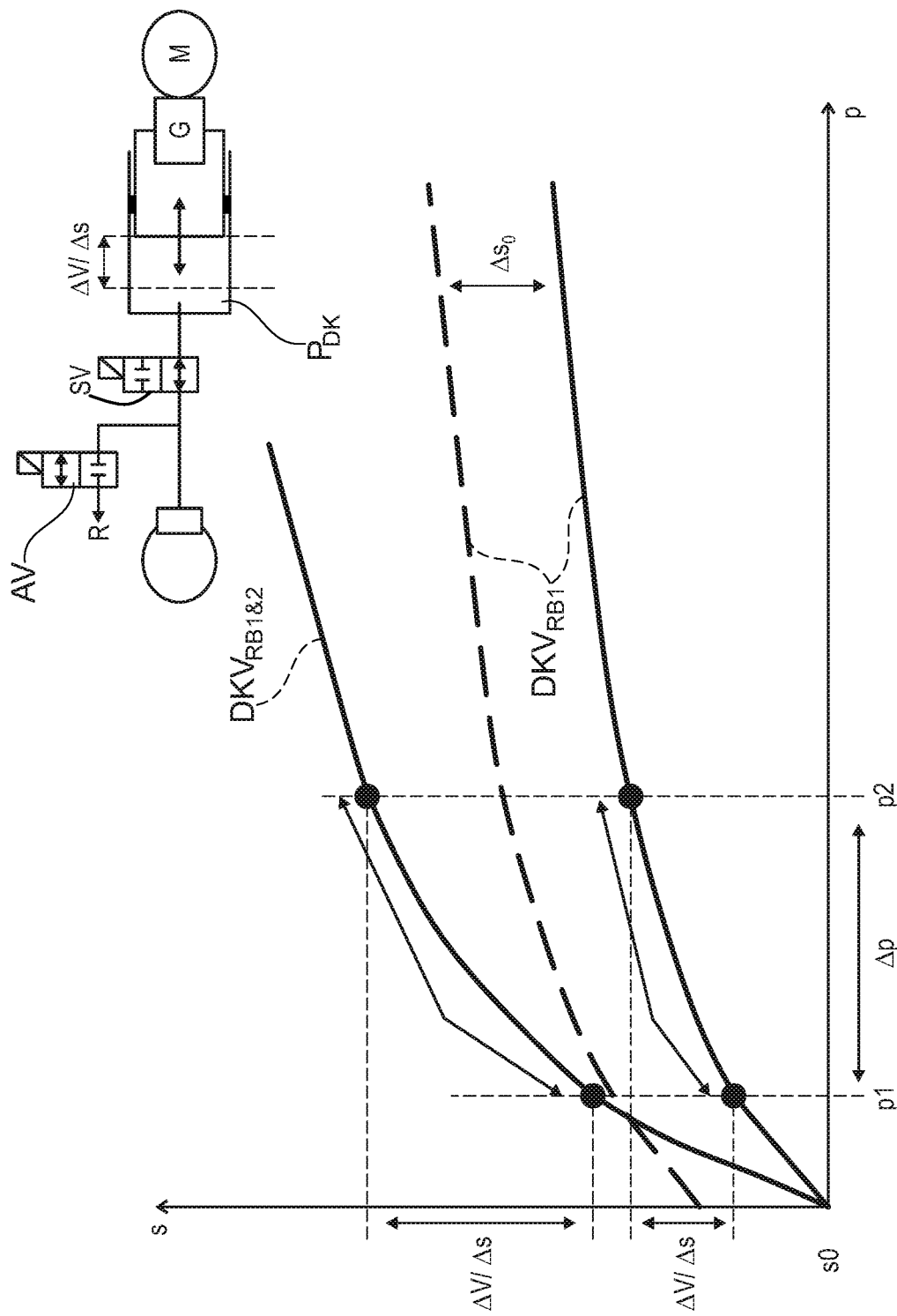
FIG. 2b: shows pressure-volume curve for wheel brake 1 and wheel brake 2 with offset shift by opening of brake circuit.

FIG. 2b describes the simplified relevant pressure-volume curves for pressure regulation without hysteresis in a closed brake circuit or shifting after pressure reduction with opened outlet valve AV. Starting from a pressure p1, by defining a nominal differential pressure Op, the necessary volume shift $\Delta V$ or travel change $\Delta s$ of the piston can be read from the curve. These differ and are dependent on whether the pressure is changed in one or more brake circuits. The piston is then moved accordingly. If the pressure is reduced via one or more outlet valves, there is a volume loss in the pressure-generating unit. For further pressure reduction or pressure build-up in the closed brake circuit, the travel allocation of the pressure-volume curve is determined by detecting the pressure. This is required in regulation for monitoring the volume balance, since the working chamber of the pressure-generating unit only has a limited volume and thus towards the end of the piston stroke, the piston would travel to the stop. If the piston of the pressure-generating unit travels close to the stop after a pressure change and a further pressure rise is impending, the piston is retracted briefly with closed switching valves SV in order to draw in volume from the storage container. In the design with double-stroke piston (FIG. 5-6), this is retracted or switched to return stroke mode.

Figure 3B:
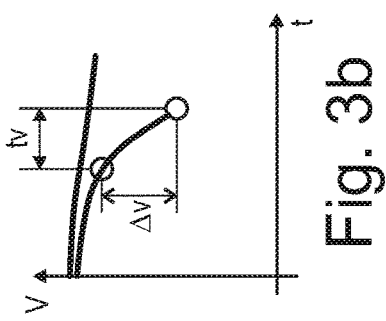
FIG. 3b: shows time control on pressure reduction via outlet valve.
Figure 3A:
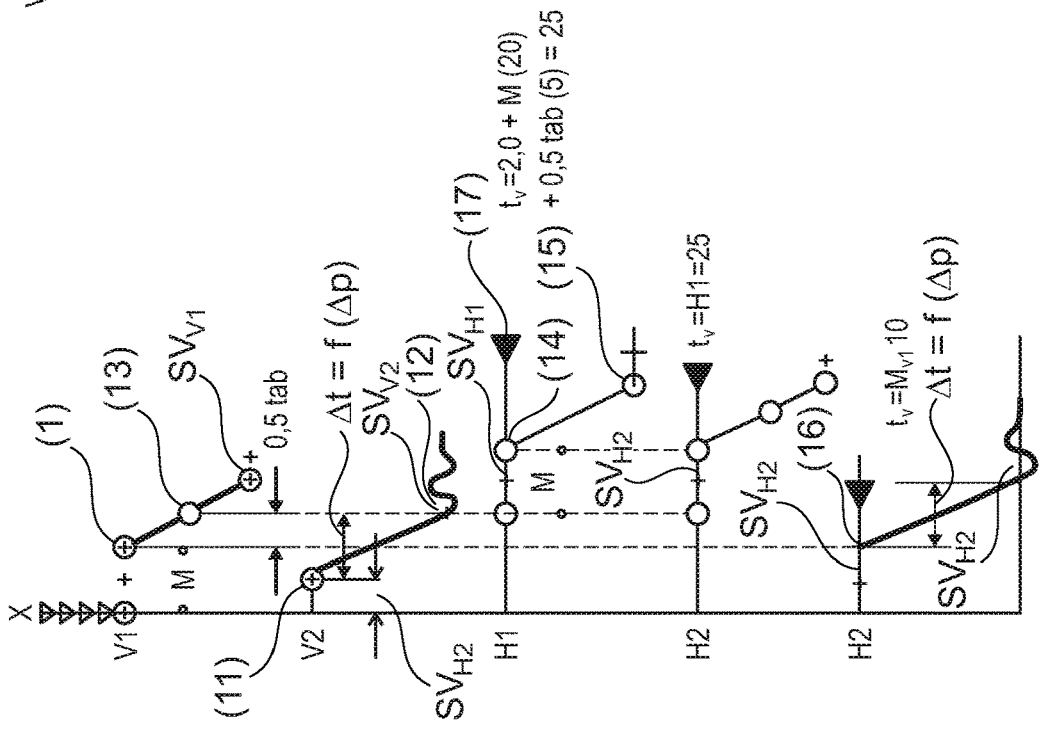
FIG. 3a: shows cycle shortening of multiplex regulation with AV valve in pressure reduction.
Figure 3:
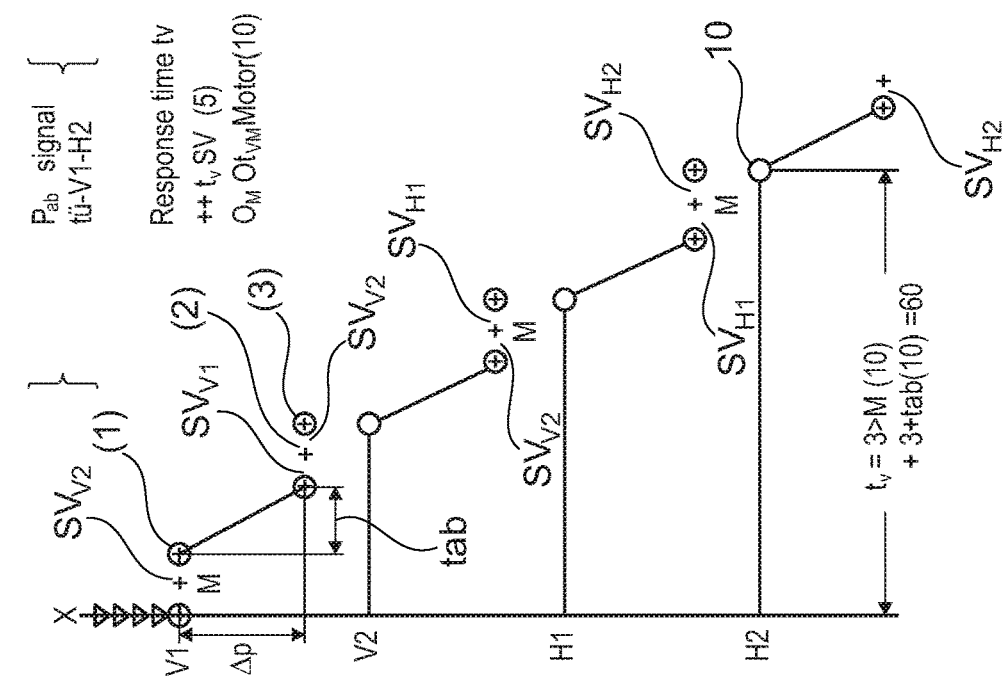
FIG. 3: shows conventional multiplex regulation in sequential order.

FIG. 3 shows a time development of the MUX regulation as known from WO 2006/111393 A1 or WO 2010/091883 A1. This system is known as the 4-channel MUX in which, except in the critical case of simultaneous pressure reduction (simultaneous $p_{ab}$), the pressure reduction $p_{ab}$ is processed serially per wheel channel (cylinder). In the worst case scenario, this leads to a great delay time which causes large speed differences or even slip because of the individual response times of the valve, motor and the time for the respective pressure reduction $p_{ab}$. This both reduces the stability of the braking and disadvantageously extends the braking distance. Optimisation is performed on the response time of the switching valves, motor and pressure reduction gradients. Costs however limit optimisation. The case of simultaneous pressure reduction $p_{ab}$ for all channels however occurs rarely in practice.

A further restriction exists in the regulation concept known from WO 2006/111393 A1 or WO 2010/091883 A1 in the necessary priority for the pressure reduction $p_{ab}$. If a pressure reduction is required, no pressure build-up $p_{auf}$ can take place. Since usually the time for pressure build-up $p_{auf}$ in the regulation cycle is around 200 ms, and two or three small $p_{auf}$ take place per control cycle each with approximately 10 ms delay time, this was not considered critical but is noted as a minor defect of the 4-channel MUX.

Figure 5:
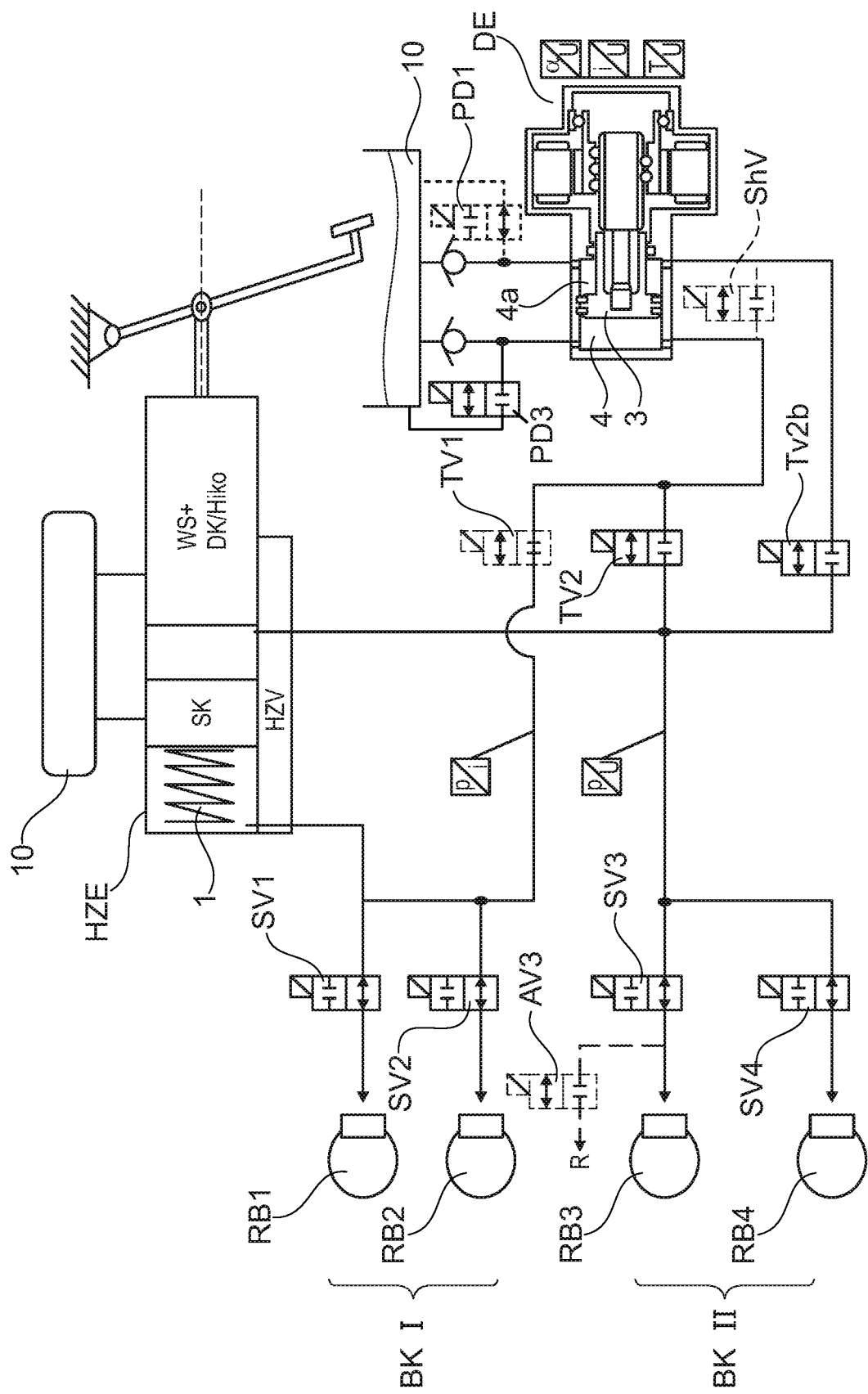
FIG. 5: shows advantageous brake system structure with double-stroke piston (DHK)
Figure 5A:
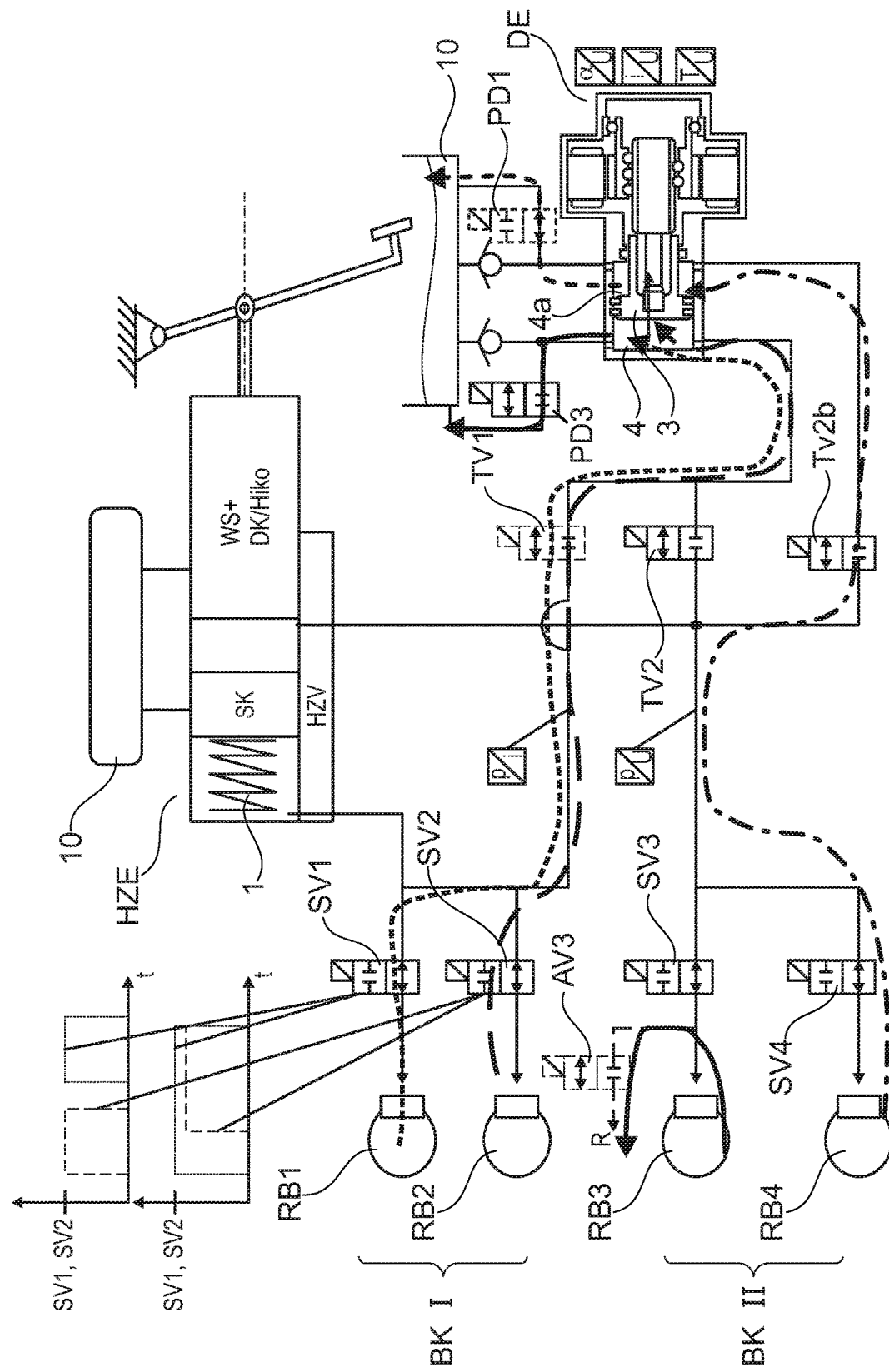
FIG. 5a shows pressure build-up regulation in multiplex mode according to the invention with DHK and outlet valve.
Figure 5B:
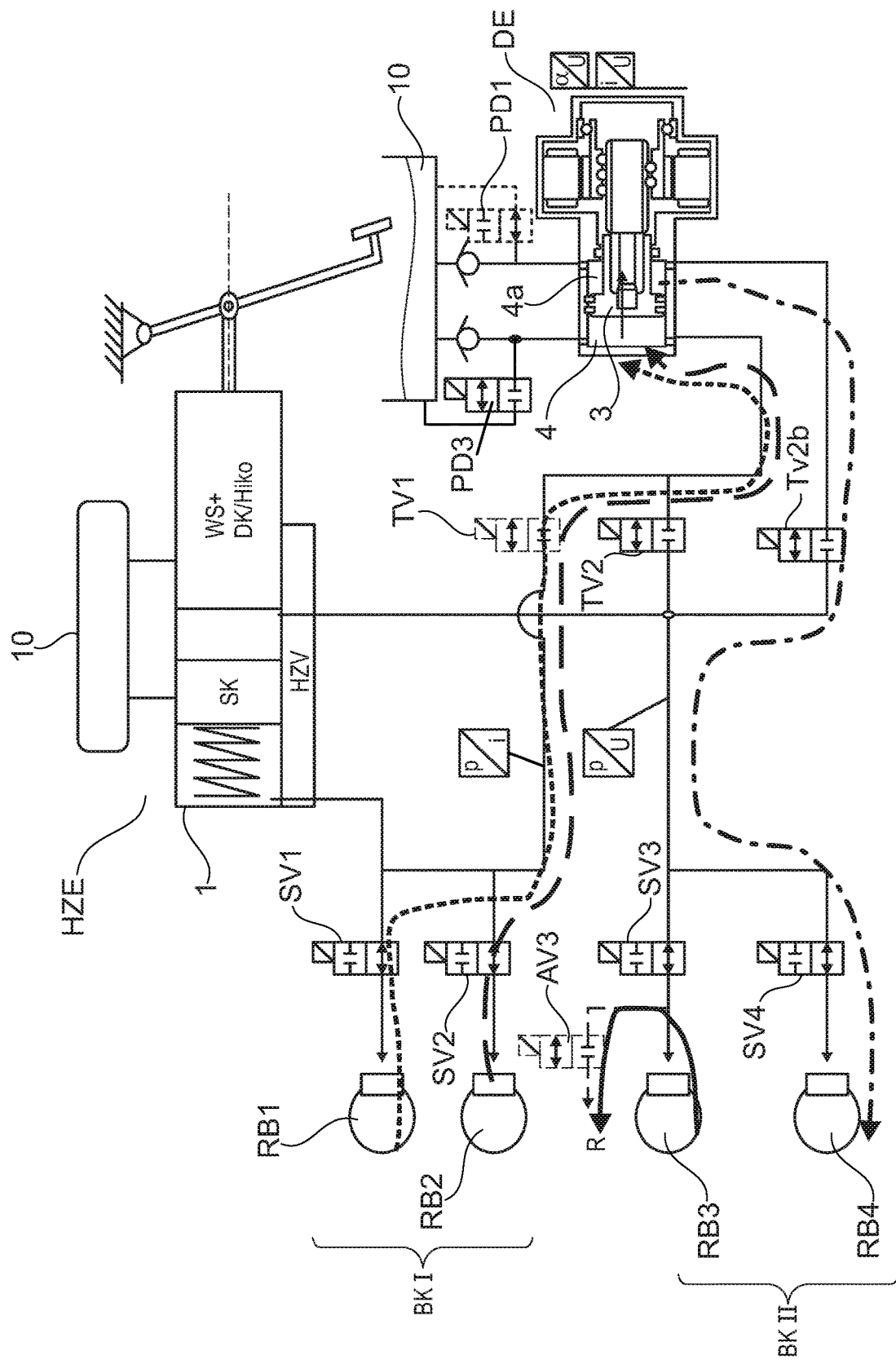
FIG. 5b shows simultaneous pressure build-up and pressure reduction in multiplex mode in DHK return stroke and outlet valve.
Figure 5C:
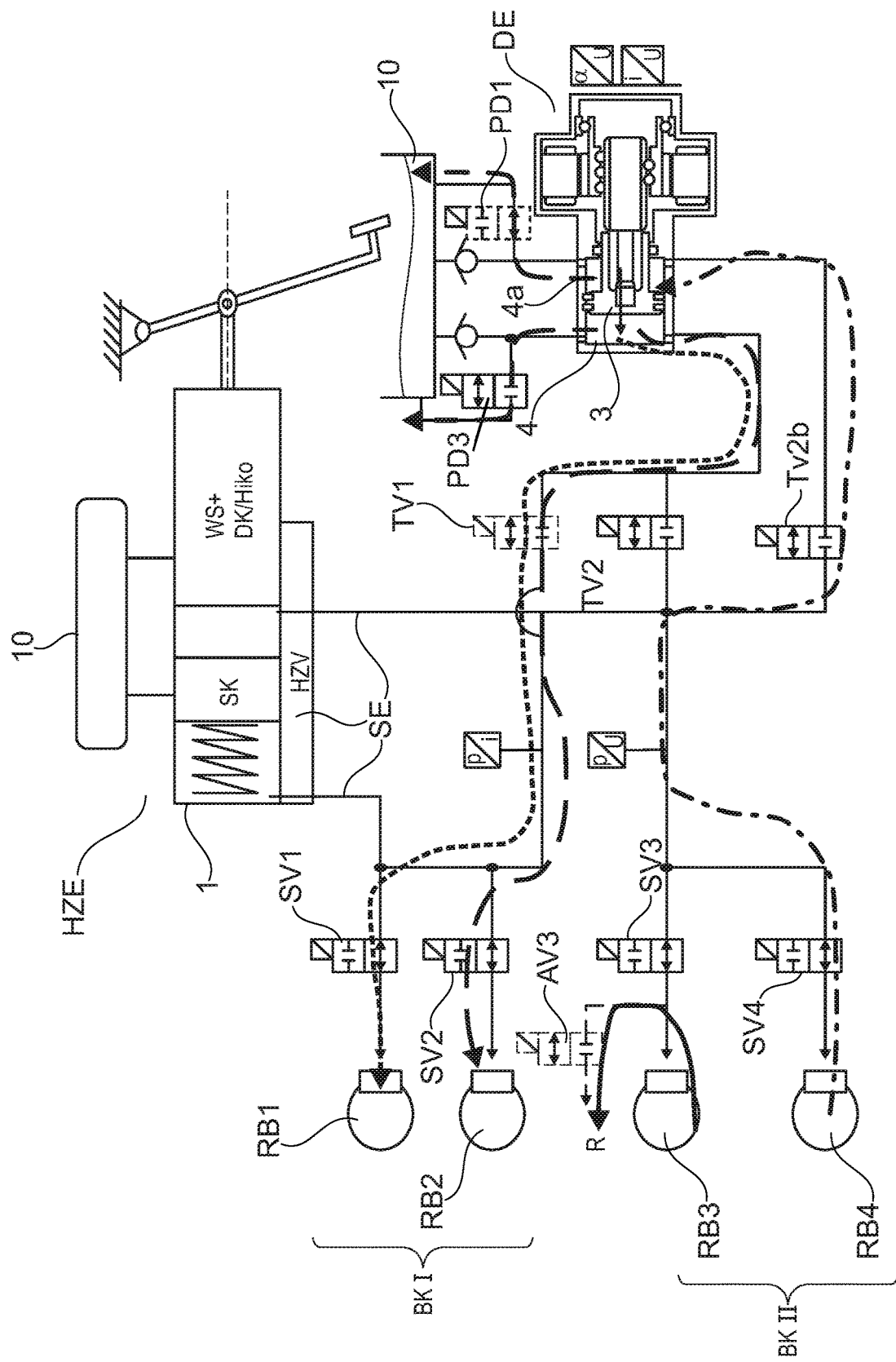
FIG. 5c shows simultaneous pressure build-up and pressure reduction in multiplex mode in DHK advance stroke and outlet valve.

The brake system according to the invention with its regulation concept offers the following improvements:
 introduction of an additional outlet valve on the front axle;
 various control methods and strategies for control and regulation of the wheel brakes, e.g. VA, corner braking;
 possibility of pressure build-up $p_{auf}$ with simultaneous pressure reduction $p_{ab}$ (described in FIG. 5b and FIG. 5c).

FIG. 3 shows the pressure curve in the individual wheel brakes over time for conventional MUX mode in which the pressure in the wheel brakes is reduced temporally successively. V1 and V2 are the front wheel brakes, H1 and H2 the rear wheel brakes. At X, the signal is given for simultaneous pressure reduction $p_{ab}$. The response time $t_vSV$ of the switching valve SV is around 5 ms. The response time $t_vM$ of the motor is around 10 ms. It is taken into account here that the pistons of the pressure-generating unit must first be positioned at (1) for the different pressure levels of the individual wheels before the pressure change. Then the pressure reduction $p_{ab}$ takes place, assuming $t_{ab}$ of around 10 ms, wherein during this time the pressure is reduced by $\Delta p$ equal to around 20 bar.

The response times for the switching valves and motor assumed in FIG. 3 are also assumed, for an objective comparison, for the depiction of the temporal pressure development in FIG. 3a which corresponds to the pressure development according to the invention.

With conventional ABS systems with 4 inlet and 4 outlet valves, the ABS regulator always determines a $\Delta p$ and then determines the time for which the outlet valve must be opened in order for the required pressure reduction to take place in the wheel brake. This time control is known to be subject to tolerances, which limits the precision of the pressure regulation. Also, on closure of the outlet valve AV, pressure fluctuations always occur which cause disadvantageous noise.

The ABS regulator here determines the necessary pressure difference $\Delta p$ substantially from the wheel angular acceleration and partially from the wheel slip, with correction factors for a) wheel inertia moment, b) gear stage and c) fading detection.

In contrast to time control, in conventional MUX as shown in FIGS. 1 and 1a, a volume control of the pressure supply is used in which $\Delta v = \Delta p$, wherein this takes place with evaluation of the pressure-volume curve of the wheel. Thus the precision of the pressure regulation is much greater, and the temporal pressure development can be influenced towards the end of the pressure reduction so that only slight pressure fluctuations occur.

At V1 in FIG. 3, after (X), the response time of $t_vM$ and $t_v$ of SV1 acts. After opening of the switching valve SV1, the motor M is able to reduce the pressure over the time $t_{ab}$. Then SV1 is closed again at (2). First however, the motor has already reached the required pressure level via the described volume control of the pressure supply.

Then the motor already begins the pressure reduction $p_{ab}$ of the front wheel V2, which takes place after opening of SV2 of V2. Thus the sequence V1-H2 has a total delay time of 60 ms with the above assumptions. This corresponds approximately to a regulation deviation Av of around 15 km/h.

FIG. 3a shows the temporal pressure curve for the regulation concept according to the invention. The pressure reduction $p_{ab}$ at the front wheel brake V1 at time (1) corresponds to (1) in FIG. 3. At the front wheel brake V2, the additional outlet valve AV is used for pressure reduction $p_{ab}$. The pressure reduction $p_{ab}$ takes place almost without delay at (11) via a time control Δt described above, at which at (12) after closure of SV2 the pressure fluctuation occurs. Thus regulation of the front wheels V1 and V2—which at high μ make a considerably greater contribution to the brake force effect than the rear wheels—is almost not delayed. During pressure reduction $p_{ab}$ of V1, the motor at (13) is already prepared for pressure change at the rear wheel H1. This take place at (14) to (15) by volume control by means of the pressure-generating unit DE. Since the rear wheels H1, H2 often have the same higher pressure level than V1 or V2, a simultaneous pressure reduction $p_{ab}$ can take place by volume control. Alternatively, at H2 at (16) a time-controlled pressure reduction $p_{ab}$ into the brake circuit can take place. One condition for this is that the MUX pressure level in the wheel brake of the rear wheel H2 is lower than at the rear wheel H1, at which the pressure reduction takes place by means of volume control. It is also possible that the pressure reduction in the rear wheel brake H2 takes place by time-controlled opening of the associated outlet valve.

Variants of the front axle and rear axle regulation are shown in detail and described in FIGS. 4, 4a, 4b. A comparison of the delay times tv in relation to the conventional MUX methods in FIG. 3 show a significant improvement at (10) with 60 ms and (17) with 25 ms. This is possible by the use of the time-controlled pressure reduction $p_{ab}$ at V2 and H2 by means of outlet valve or into the brake circuit, partially simultaneous $p_{ab}$ at H1 and H2, and priority control at H1 and (13).

FIGS. 4-4b show the pressure development with different actual pressure levels and variants of the front and rear wheels H1, H2, V1 and V2 with the regulation concept according to the invention.

FIG. 4 shows the temporal pressure development V1 to H2 in different phases. Phase 0-X shows a pressure development in which, because of the different pressure levels in the wheel brakes, no simultaneous pressure build-up $p_{auf}$ and pressure reduction $p_{ab}$ can take place, which is most often the case. Consequently, here also full multiplex mode is active i.e. precise Δp regulation via volume control both for pressure build-up $p_{auf}$ and for pressure reduction $p_{ab}$. At pressure build-up $p_{auf}$, sometimes e.g. at 20 with simultaneous pressure build-up requirement, a temporally offset pressure build-up $p_{auf}$ takes place at H1 and H2. However also a partially simultaneous pressure build-up $p_{auf}$ may take place. Also, a partially simultaneous pressure reduction is possible as shown in FIG. 4b.

At X in FIG. 4, the signal $p_{ab}$ for simultaneous pressure reduction in all wheel brakes is given, which is implemented without time delay. These two variants A and B are shown in more detail in FIG. 4a and FIG. 4b.

FIG. 4a shows the variant A, again starting at point X, with $p_{ab}$ at V1 and V2 as described in FIG. 3a. At the front wheel V1, the pressure reduction $p_{ab}$ takes place by means of volume control by the pressure-generating unit DE. For the rear wheel H2, at 21 a controlled $p_{ab}$ takes place over time dt=f(dp). This pressure reduction takes place when a sufficient differential pressure Δp between H2-V1 is present. The pressure levels of all wheels are known in the regulation concept according to the invention or MUX method, so that a relatively precise pressure reduction $p_{ab}$ in the rear wheel H2 is achieved by the time control or opening of the switching valve SVH2. The necessary opening time Δt may, because of the change in pressure level, be adapted flexibly by M1 (MUX). The pressure reduction $p_{ab}$ of the rear wheel H1 also takes place via volume control, starting from the preparation at 13, and then by opening of the associated switching valve at 22.

As a result, there is a relatively small tvmax as described in FIG. 3a. At 11, the time-controlled pressure reduction $p_{ab}$ for the front wheel V2 takes place. Here again, the pressure difference from the storage container is known and hence a precise pressure control is possible by the time-controlled opening of the outlet valve.

FIG. 4b shows variant B for partially simultaneous pressure reduction at the rear wheels H1 and H2, starting from a relatively small pressure difference between the rear wheels H1 and H2. Here, after preparation at 13, at 23 the pressure reduction $p_{ab}$ takes place with MUX, i.e. volume control by means of the pressure-generating unit. At 24, the rear wheel H2 is switched to pressure reduction $p_{ab}$ by opening of the switching valve SVH2 assigned to the rear wheel H2. At 25, the controlled pressure reduction $p_{ab}$ for H2 is achieved, so the switching valve SVH2 is closed. At 26, via the volume control, the Δp for the rear wheel H1 is reached, so at 26 the switching valve SVH1 is closed.

Both methods allow a short delay time. In some cases, the controlled pressure reduction $p_{ab}$ causes the pressure fluctuations, which however only occur in extreme cases with simultaneous pressure reduction $p_{ab}$.

To summarise and in addition, the following features apply:

the pressure of each wheel at the start and end of the pressure reduction $p_{ab}$ (FIG. 4, 4a) is stored in the memory; the two values are used as reference for the subsequent pressure changes of the wheel or following wheels;

the pressure of the last pressure build-up $p_{auf}$ (FIG. 4) is stored in the memory and thus forms the basis for setting the pressure of the pressure-generating unit DE in preparation for the following pressure reduction $p_{ab}$;

the outlet valves AV are time-controlled, wherein for this the pressure difference from the storage container is taken into account; one wheel of the front axle is connected to the brake circuit only via switching valve SV, wherein a switching valve SV towards the brake circuit and an outlet valve AV towards the storage container are assigned to the second wheel of the front axle, so that switching valves SV of the rear axle are time-controlled to $p_{ab}$, while MUX controls the wheels of the front axle with low pressure level, in which the time control $t_{ab}$ of the switching valves SV of the rear axle HA evaluates the differential pressure Δp;

as well as the differential pressure, for the time control (valves are opened for a predefined time), the Δp of the corresponding outlet valve AV is evaluated from the pressure-volume curve. Priority control of the MUX with orientation towards driving stability with braking distance, e.g. wheel of the front axle VA has priority and also, at positive μ jump with highest negative $p_{ab}$, or positive acceleration $p_{auf}$, since here the Δp to be regulated is greatest;

the pressure change by volume control by means of the pressure-generating unit, and the time-controlled opening of outlet valve or switching valve used in parallel, forms the combined MUX regulator;

in time control, the corresponding volume must be taken into account in the volume delivery, corresponding to the pressure change Δp determined by the regulator.

FIG. 5 describes a further embodiment of the pressure supply unit DE according to the invention with pressure regulation with master brake cylinder, master brake cylinder valves HZV, pressure supply with double-stroke piston, switching and outlet valves.

The master brake cylinder HZE is connected to brake circuits BKI and BKII. For the separation logic, the same applies as in FIG. 1a. The advance stroke chamber 4 of the double-stroke piston 3 is connected to brake circuit BI via the isolating valve TV1, and to BK II via the isolating valve TV2. The return stroke chamber 4a is connected via the isolating valve TV2b to BK II and via HZE to BK I. The transmission preferably takes place by the floating piston SK. The advance stroke chamber 4 and return stroke chamber 4a can be connected together hydraulically via a switching valve ShV. This switching valve SvH allows a short-circuit between the two chambers, and is used in particular on advance stroke (towards the left) to reduce the hydraulically active area of the piston 3. The return stroke chamber 4a of DHK 3 is connected via the switching valve PD1 to the storage container 10. The two chambers 4 and 4a are also each connected via a check valve to the storage container 10. This system configuration offers the following degrees of freedom:

pressure build-up and pressure reduction in all brake circuits with multiplex regulation (pressure regulation with pressure-volume control) in all wheel brake cylinders simultaneously or sequentially via isolating valves TV1, TV2 and PD1, and the switching valves SV1-SV4 of the wheel brakes RB1-RB4;

multiplex regulation in pressure build-up and pressure reduction in brake circuit I and pressure reduction in brake circuit II via outlet valves AV3, ZAV;

multiplex regulation with simultaneous pressure reduction in brake circuit BK I and pressure build-up in BK II via double-stroke piston control;

multiplex regulation with simultaneous pressure reduction in brake circuit BK II and pressure build-up in BK I via double-stroke piston control;

pressure reduction RB3 at any time via AV3 in multiplex regulation.

FIG. 5a shows as an example some of the pressure regulation possibilities which may take place temporally in parallel with each other:

controlled pressure reduction in RB1 via SV1, TV1 by pressure-volume control by means of return stroke of the double-stroke piston 3 with open PD3 valve, or alternatively pressure control of pressure reduction via pressure estimation based on phase current measurement in brake circuit I;

controlled pressure reduction in RB2 via SV2, TV1 via pressure-volume control by means of return stroke of double-stroke piston 3 with open PD3 valve, or alternatively pressure control of pressure reduction via pressure estimation based on phase current measurement in brake circuit I;

pressure reduction in RB3 via AV3 with time control of outlet valve AV3;

pressure reduction in RB4 by means of double-stroke piston 3 with time control of one of the switching valves SV4 or PD1, wherein the other valve must also be opened at this time, or alternatively pressure control of pressure reduction via pressure estimation based on pressure measurement in brake circuit II.

For simultaneous pressure reduction $p_{ab}$ at different starting pressures, optionally a deviation may occur from the MUX regulation in that the switching valves SV1 and SV2 are opened with time offset. The isolating valve TV1 is here opened continuously on pressure reduction. Since a higher pressure prevails in RB1, the switching valve SV1 is opened before switching valve SV2. On the basis of knowledge of the pressure difference (wheel pressure RB1 and RB2 and pressure in the advance stroke chamber of the pressure supply unit), the time control can be dimensioned precisely. If the pressure in the advance stroke chamber of the pressure supply unit DE is not determined precisely, because at the same time a pressure reduction via ZAV is taking place in wheel brake RB4, and TV2 is closed, the pressure in the advance stroke chamber may be used via pressure estimation p/i from the torque of the electric motor. The switching valve SV2 is open when the pressure of the pressure-generating unit DE is approximately reached. The further pressure reduction then takes place simultaneously in both wheel brake cylinders by control via piston 3 with open SV1, SV2 and TV1. When the target pressure of a respective wheel is reached, the corresponding valve SV1 or SV2 is closed. If further pressure reduction is required in a wheel, further pressure reduction can take place only in one wheel brake.

In parallel to the pressure reduction control in MUX mode, in BK II the pressure can be reduced by time control of AV3. This can be determined temporally freely because closure of SV3 does not influence the other wheel brake cylinders. Also, the temporal activation of the pressure reduction in wheel brake RB4 can be selected freely on pressure reduction of BK 1 in MUX mode.

FIG. 5b shows as an example some of the pressure regulation possibilities which may take place temporally in parallel with each other:

controlled pressure reduction in RB1 via switching valves SV1 and TV1 via pressure-volume control by means of return stroke of double-stroke piston 3 with closed PD1 valve;

controlled pressure reduction in RB2 via switching valves SV2 and TV1 via pressure-volume control by means of return stroke of double-stroke piston 3 with closed PD1 valve;

pressure reduction in RB3 via outlet valve AV3 with time control Δt (opening of AV3 valve for period Δt);

pressure build-up in RB4 via isolating valve TV2b (ZAV) with pressure-volume control by means of return stroke of double-stroke piston with closed PD1 valve.

For simultaneous pressure reduction and pressure build-up in wheel brake RB4, the pressure build-up dynamic is determined by the pressure reduction dynamic and the effective piston area and hydraulic differential pressures. This must be taken into account in the regulation. When the target pressure is reached in wheel brake RB4, the switching valve SV4 is closed. If the pressure in BKI is to be reduced further, PD1 is opened for further pressure reduction in brake circuit I.

FIG. 5c shows as an example some of the pressure regulation possibilities which may take place temporally in parallel with each other:

controlled pressure reduction in RB1 via switching valves SV1 and TV1 via pressure-volume control by means of advance stroke of double-stroke piston 3 with open PD1 valve;

controlled pressure reduction in RB2 via switching valves SV2 and TV1 via pressure-volume control by means of advance stroke of double-stroke piston 3 with open PD1 valve;

pressure reduction in RB3 via outlet valve AV3 with time control of outlet valve AV3;

pressure reduction in RB4 via double-stroke piston 3 with time control of switching valve SV4 or PD1 valve.

For the many functions of pressure reduction $p_{ab}$ in one brake circuit and pressure build-up $p_{auf}$ in the other brake circuit, it is possible for the floating piston SK of the master brake cylinder HZE to move. To prevent this, a blocking element SE may be arranged in BK1 or BK2 which acts directly on the SK as mechanical blocking. The blocking element may also be part of the HZV.

With this pressure regulation system, the functions described in 5b and 5c of $p_{auf}$ in one brake circuit and $p_{ab}$ in the other can be implemented independently of the pressure level of the brake circuits.

Figure 5D:
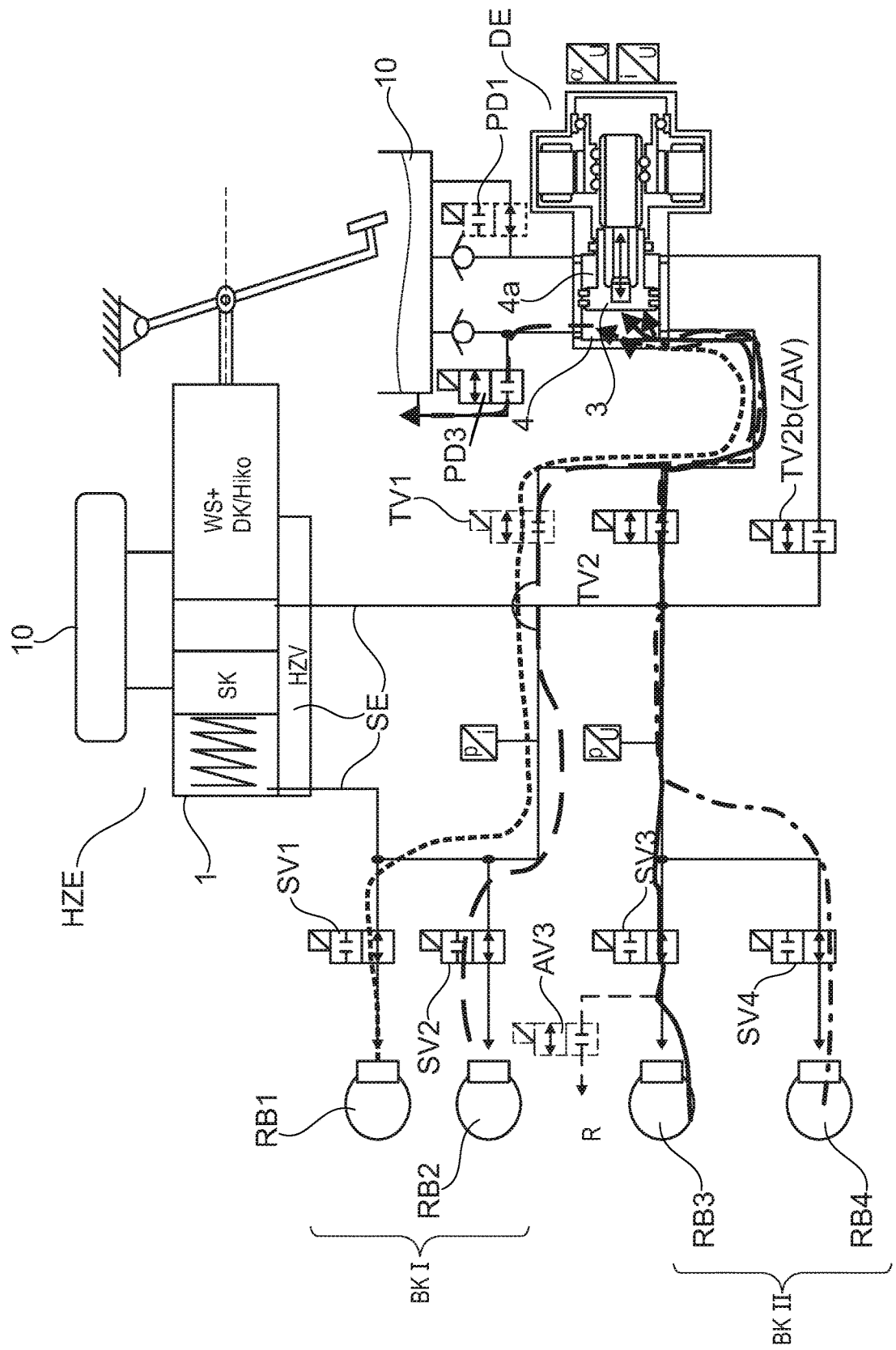
FIG. 5d shows regulated or controlled pressure reduction in both brake circuits in closed circuit via pressure-generating unit and PD3 valve.

FIG. 5d shows as an example the pressure reduction in brake circuit I and brake circuit II which is implemented on pressure reduction from high pressures. With isolating valves TV1 and TV2 open, the following is carried out:

controlled pressure build-up in RB1 by time control of valves SV1 and PD3 via pressure control of the pressure reduction by pressure estimation based on phase current measurement in brake circuit I;

controlled pressure build-up in RB2 by time control of valves SV2 and PD3 via pressure control of the pressure reduction by pressure estimation based on phase current measurement in brake circuit I;

controlled pressure build-up in RB3 by time control of valves SV3 and PD3 via pressure control of the pressure reduction by pressure measurement based on the pressure sensor in brake circuit II;

controlled pressure build-up in RB4 by time control of valves SV4 and PD3 via pressure control of the pressure reduction by pressure measurement based on the pressure sensor in brake circuit II.

For pressure reduction for individual wheels, in the same way as shown in in FIG. 5a, the switching valves SV1-SV4 may be switched with a temporal offset.

One possibility (not shown) is that of pressure reduction via PD1 valve which is similar to the process for PD3 valve. The pressure reduction may take place for all brake circuits via the PD1 valve. The pressure reduction may also take place via PD3 and PD1 valve. This is similar to FIG. 5a with the difference that the pressure of all wheel brakes is reduced via the pressure supply unit, and hence the advantages of pressure reduction in the closed brake circuit are obtained, which has safety advantages in particular after completion of a braking process (e.g. after ABS operation).

Figure 6:
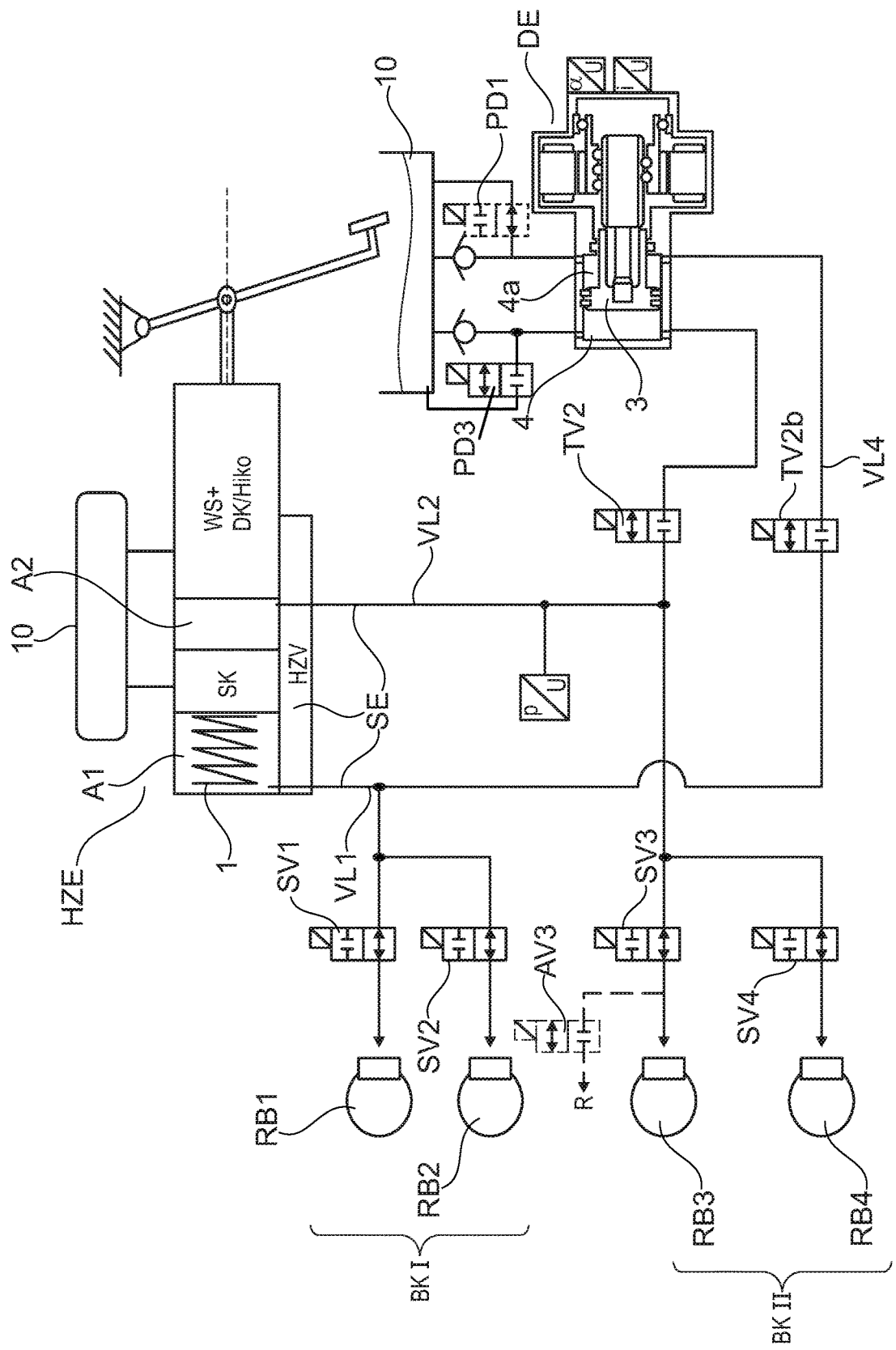
FIG. 6: shows double-stroke piston system in advantageous dual circuit design.

FIG. 6 describes a system with double-stroke piston in advantageous dual circuit design. The structure of THZ, DE and the valve circuits for pressure control ABS with MUX and AV is identical to FIG. 5c.

in contrast to FIG. 5c, the pressure supply in the advance stroke acts on brake circuit II and the back of the floating piston SK. This transmits the volume and pressure to brake circuit I. If the double-stroke piston has travelled close to the end position, it is reversed and operated in return stroke and acts on BK I. Then via the return stroke, pressure acts on the front side of the floating piston SK. This transmits the pressure again to brake circuit BK II. The SK piston is always active with its seals, as in the current THZ.

The double-stroke piston 3 also has a bypass valve ShV, which is switched substantially under three conditions:

a) at high pressure, to reduce the piston force, the volume of the advance stroke is also conducted to the back of the double-stroke piston 3 to balance the pressure;

b) in ABS regulation and also MUX regulation, the double-stroke piston 3 is switched in a single circuit via the ShV valve;

c) pressure reduction $p_{ab}$ from high pressure level takes place simultaneously in both brake circuits BK I and BK II.

This valve circuit has the consequence for the floating piston position that the return spring 1 moves the floating piston SK to the right stop or locks it in the middle position. The pressure sensor 9 measures the pressure in BK II and, with a "single circuit" arrangement for the regulation and control functions, can evaluate the pressure in both brake circuits.

For special functions with pressure build-up $p_{auf}$ in BK I and pressure reduction $P_{ab}$ in BK II and vice versa, it is advantageous to place in the connection to THZ in BK II, or a blocking element SE in brake circuit BK 1 which prevents the movement of the floating piston SK. The blocking valve SE may also be part of the HVZ.

This system contains the additional potential for reducing the pressure in BK II via the DHK piston 3, and separately from BK I via the valves TV2b and PD1.

This solution has advantages in use for different pressure level activation on the two axles in recuperation. For this, the blocking element SE must then be used at SK or in BK I.

The functions described in FIGS. 5-6 and the additional overlaid time control via outlet valve(s) give the MUX system according to the invention a very good performance with high regulation dynamic and precision, with significantly lower cost than individual wheel regulation with inlet and outlet valves.

What is claimed is:

1. A brake system for motor vehicles, including:
   an actuation device in the form of a brake pedal,
   a travel simulator arranged to generate a feedback force on the actuation device,
   a first piston-cylinder device, wherein the piston-cylinder device has at least one piston and at least one working chamber and is connected via one or more hydraulic connecting lines to one or more wheel brakes of one or more brake circuits,
   a control device,
   at least one pressure supply unit driven by an electric motor and having a double-stroke piston, a first working chamber, and a second working chamber, wherein, by means of the pressure supply unit, brake pressure is enabled to be built up or reduced in one or more of the wheel brakes simultaneously, wherein the first working chamber is connectable via a first controllable switching valve with a storage container and the second working chamber is connectable via a second controllable switching valve with the storage container, and one or more outlet valves, wherein either a respective outlet valve of the one or more outlet valves is associated with only a respective one of the one or more wheel brakes or a respective outlet valve of the one or more outlet valves is associated with only one wheel brake of a respective one of the one or more brake circuits, wherein the one or more outlet valves are arranged in respective hydraulic connection(s) between the wheel brake(s) with which it/they are associated and the storage container, there being no further valve (s) arranged between the one or more outlet valves and the storage container, wherein the brake system is adapted to determine a required pressure change in one or more wheel brakes, wherein the brake system is further adapted to utilize a pressure-volume mapping to determine a defined stroke distance for the required pressure change, wherein a pressure volume control is implemented by displacing the double-stroke piston by the defined stroke distance, wherein at least one of the one or more wheel brakes is assigned to a respective one of the brake circuits and each of the one or more wheel brakes is enabled to be connected to an associated one of the one or more connecting lines via a respective third controllable switching valve, wherein the respective controllable switching valve is open in an unpowered state, and wherein the wheel brake pressure is reducible via establishing a hydraulic connection of one of the first or second working chambers of the pressure supply unit with the storage container by opening the respective one of the first or second controllable switching valve as follows:

a) in at least one or more of the wheel brakes, controlled pressure reduction is arranged to occur via the respective third controllable switching valve associated with the respective wheel brake(s) via the pressure volume control by means of a return stroke of the double-stroke piston into the storage container, and/or b) in at least one or more of the wheel brakes, controlled pressure reduction takes place via the respective third controllable switching valve associated with the respective wheel brake(s) via the pressure volume control by means of a forward stroke of the double-stroke piston into the storage container, wherein the wheel brake pressure of the at least one or more of the wheel brakes is further reducible by opening the respective one of the one or more outlet valves associated with the at least one of the one or more wheel brakes or the wheel brake of the respective one of the one or more brake circuits by, in parallel with a) and/or b), in at least one wheel brake, using a time control of the respective one of the one or more outlet valves to allow pressure medium to thereby flow into the storage container, wherein the control device includes a memory that stores actual wheel brake pressures set in the respective wheel brakes and/or continuously calculates in a control model probable brake pressures of the respective wheel brakes and updates these with measured values, wherein for simultaneous pressure reduction in at least two of the one or more wheel brakes of one of the brake circuits, to different nominal pressures, the control unit evaluates a respective pressure-volume curve of respective wheel brakes of the at least two wheel brakes and uses a lowest nominal pressure to be generated to calculate a piston travel of the double-stroke piston required for this and moves the piston by the piston travel of the double-stroke piston by means of a drive of the pressure supply unit, wherein a respective third controllable switching valve associated with a wheel brake of the one or more wheel brakes associated with the lowest nominal pressure remains open until the lowest nominal pressure has been set in that wheel brake; and wherein for the third controllable switching valves associated with the other wheel brakes not associated with the lowest nominal pressure, the control device calculates individually temporal duration(s) for which the respective third controllable switching valves must remain open so that the pressure(s) in the respective other wheel brakes is/are reduced to the respective nominal pressure(s), and opens the respective third controllable switching valve(s) only for the respective calculated duration(s), wherein a respective third controllable switching valve is opened first at a time at which pressure in an associated brake circuit is equal to or higher than an actual pressure in the wheel brake associated with the lowest nominal pressure, and wherein at the same time as or temporally overlapping pressure reduction in the various ones of the one or more wheel brakes over the brake circuit(s), pressure is reduced in at least one further wheel brake of the one or more wheel brakes by opening an associated outlet valve of the one or more outlet valves.

2. The brake system according to claim 1, wherein at least one of the following is true:
- a respective one of the outlet valves is assigned to a front wheel brake of the one or more wheel brakes;
- at least one pressure sensor is arranged to determine pressure in at least one of the brake circuits;
- the third controllable switching valves are digital valves and are open in an unpowered state.

3. The brake system according to claim 1, wherein both the first and second working chambers of the pressure supply unit are able to be used, by corresponding activation of isolating valves, for simultaneous and/or temporally offset pressure build-up or pressure reduction in the one or more wheel brakes of the one or more brake circuits.

4. The brake system according to claim 1, wherein each respective wheel brake of the one or more wheel brakes has an associated third controllable switching valve, wherein an interior or armature housing of the respective third controllable switching valve is connected via a hydraulic line to an associated actuator or an associated one of the brake circuits and a valve seat outlet is connected via a hydraulic line to the respective wheel brake.

5. The brake system according to claim 1, wherein the second working chamber of the pressure supply unit is connected via a hydraulic connection to the storage container, wherein the first controllable switching valve serves to open the hydraulic connection such that a pressure reduction in at least one of the one or more wheel brakes is enabled to take place time-controlled by opening at least one of the third controllable switching valves associated with the at least one of the one or more wheel brakes and by opening the first controllable switching valve, wherein a predefined opening time determines a wheel brake pressure to be set via the first working chamber of the pressure supply unit, wherein, using the pressure supply unit, a volume-controlled pressure reduction or pressure build-up takes place in at least one of the wheel brakes of a first one of the brake circuits when the third controllable switching valves associated with respective ones of the wheel brakes are open simultaneously.

6. The brake system according to claim 1, wherein:
the first working chamber of the pressure supply unit is connected via a hydraulic connection to the at least one working chamber of the first piston-cylinder unit, wherein the hydraulic connection is enabled to be shut off by movement of the at least one piston of the first piston-cylinder unit into a shut-off position which is enabled to be assumed automatically;

and/or on pressure build-up or on pressure reduction, the control device takes into account an absolute position of the double-stroke piston and determines a necessary movement travel of the double-stroke piston depending on actual pressures, nominal pressures, and pressure-volume curve of respective ones of the one or more wheel brakes involved in the pressure build-up or pressure reduction;

and/or in normal operation with normal brake force amplification, recuperation, and anti-lock braking (ABS) at low u, a pressure is built up and reduced simultaneously or sequentially in all wheel brakes via travel control of the double-stroke piston of the pressure supply unit, taking into account respective pressure-volume curves associated with the respective wheel brakes, and wherein in operating situations with ABS at high u, u split, electronic stability program (ESP) and anti-slip regulation (ASR), pressure in at least one of the wheel brakes is reduced via at least one of the outlet valves associated with the at least one of the wheel brakes and/or via outlet valves of the pressure supply unit at the same time.

7. The brake system according to claim 1, wherein:
by means of the actuation device, on failure of the pressure supply unit or upon occurrence of another fault, in a fall-back level, the at least one piston of the first piston-cylinder device is enabled to be set to build up pressure in at least one of the one or more wheel brakes;

and/or pressure reduction takes place via a travel-controlled stroke of the double-stroke piston of the pressure supply unit or via a connecting line of one of the working chambers of the double-stroke piston with the first and second switchable valves open into the storage container, wherein the control device uses pressure(s) measured in the respective brake circuit(s) or pressure(s) calculated to control the pressure reduction;

and/or the pressure reduction takes place at high pressures of approximately 200 bar down to pressures in a range close to a blocking pressure in normal operation (approx. 80-100 bar) via pressure or time control of the second controllable switching valve with simultaneous or temporally offset travel control of the double-stroke piston in advance stroke mode and subsequent pressure reduction to atmospheric pressure by pressure-volume control in return stroke mode of the double-stroke piston.

8. A brake system for motor vehicles, including:
an actuation device in the form of a brake pedal,
a travel simulator arranged to generate a feedback force on the actuation device,
a first piston-cylinder device, wherein the piston-cylinder device has at least one piston and at least one working chamber and is connected via one or more hydraulic connecting lines to one or more wheel brakes of one or more brake circuits,
a control device,
at least one pressure supply unit driven by an electric motor and having a double-stroke piston, a first working chamber, and a second working chamber, wherein, by means of the pressure supply unit, brake pressure is enabled to be built up or reduced in one or more of the wheel brakes simultaneously, wherein the first working chamber is connectable via a first controllable switching valve with a storage container and the second working chamber is connectable via a second controllable switching valve with the storage container, and
one or more outlet valves, wherein either a respective outlet valve of the one or more outlet valves is associated with only a respective one of the one or more wheel brakes or a respective outlet valve of the one or more outlet valves is associated with only one wheel brake of a respective one of the one or more brake circuits, wherein the one or more outlet valves are arranged in respective hydraulic connection(s) between the wheel brake(s) with which it/they are associated and the storage container, there being no further valve(s) arranged between the one or more outlet valves and the storage container,
wherein the brake system is adapted to determine a required pressure change in one or more wheel brakes, wherein the brake system is further adapted to utilize a pressure-volume mapping to determine a defined stroke distance for the required pressure change, wherein a pressure volume control is implemented by displacing the double-stroke piston by the defined stroke distance,
wherein at least one of the one or more wheel brakes is assigned to a respective one of the brake circuits and each of the one or more wheel brakes is enabled to be connected to an associated one of the one or more connecting lines via a respective third controllable switching valve, wherein the respective controllable switching valve is open in an unpowered state, and
wherein the wheel brake pressure is reducible via establishing a hydraulic connection of one of the first or second working chambers of the pressure supply unit with the storage container by opening the respective one of the first or second controllable switching valve as follows:

a) in at least one or more of the wheel brakes, controlled pressure reduction is arranged to occur via the respective third controllable switching valve associated with the respective wheel brake(s) via the pressure volume control by means of a return stroke of the double-stroke piston into the storage container, and/or b) in at least one or more of the wheel brakes, controlled pressure reduction takes place via the respective third controllable switching valve associated with the respective wheel brake(s) via the pressure volume control by means of a forward stroke of the double-stroke piston into the storage container, wherein the wheel brake pressure of the at least one or more of the wheel brakes is further reducible by opening the respective one of the one or more outlet valves associated with the at least one of the one or more wheel brakes or the wheel brake of the respective one of the one or more brake circuits by, in parallel with a) and/or b), in at least one wheel brake, using a time control of the respective one of the one or more outlet valves to allow pressure medium to thereby flow into the storage container, wherein the pressure supply unit includes a drive motor, and wherein for pressure build-up and/or pressure reduction in at least one of the one or more wheel brakes, the control device evaluates a pressure-volume curve of the at least one wheel brake and based on pressure rise or fall to be generated, calculates a piston travel of the double-stroke piston required for the pressure rise or fall to be generated and by corresponding actuation of various ones of the various valves, moves the double-stroke piston by the piston travel also by means of the drive, wherein the control device determines a first pressure in a first one of the brake circuits via a pressure sensor and determines a second pressure in a second one of the brake circuits via a phase current of the drive motor, and takes account of a determined or calculated brake circuit pressure in controlling the pressure build-up and/or pressure reduction in the at least one of the one or more wheel brakes, in the calculation of the required piston stroke of the double-stroke piston, also taking into account the pressure-volume curve(s) of the wheel brake(s) concerned and associated valve opening time(s).

9. The brake system according to claim 8, wherein:
the control device has a memory which contains a respective actual wheel brake pressure set in each wheel brake, wherein using the stored actual wheel brake pressure and a nominal wheel brake pressure, the control unit determines, taking into account pressure-volume curve(s) of the wheel brake(s), a respective time for which the respective one of the outlet valves associated with the wheel brake(s) must be opened in order to reach the nominal wheel brake pressure in the respective wheel brake, and wherein the control device closes the respective one of the outlet valves after expiry of the respective time.

10. The brake system according to claim 9, wherein the control device is enabled to reduce brake pressure in a first wheel brake of the one or more wheel brakes to which an outlet valve of the one or more outlet valves is assigned, using the outlet valve, which is opened for a precalculated time, to enable flow of pressure medium into the storage container, wherein for simultaneous pressure reduction or pressure build-up in a second one of the one or more wheel brakes of the same one of the brake circuits as the first wheel brake and/or at least one further wheel brake of the one or more wheel brakes associated with a different one of the brake circuits from the brake circuit associated with the first wheel brake, the control device is enabled to open the respective assigned third controllable switching valve(s) and to set or regulate nominal brake pressure in the first wheel brake by means of corresponding activation of the pressure supply unit.

11. The brake system according to claim 9, wherein an outlet valve, of the one or more outlet valves, assigned to a first one of the one or more wheel brakes of a first one of the brake circuits serves for pressure reduction in the first wheel brake and a second one of the wheel brakes of the first one of the brake circuits, wherein for common pressure reduction the control device is enabled to open two of the third controllable switching valves associated with the first and second wheel brakes and the outlet valve during opening of the two third controllable switching valves, the control device is enabled to separate the first one of the brake circuits from the pressure supply unit by closing an associated one of the isolating valves or by locking the piston of the first piston cylinder system.

12. The brake system according to claim 8, wherein for simultaneous or temporally offset pressure reduction and/or pressure build-up by means of the pressure supply unit, the control unit is enabled to set a pressure in the at least one pressure chamber of the pressure supply unit and to open and/or close the third controllable switching valves simultaneously and/or with temporal offset in order to set nominal pressure required in the respective ones of the one or more wheel brakes, wherein by means of the one or more outlet valves, pressure is able to be reduced in at least one wheel brake of the one or more wheel brakes assigned to a respective one of the one or more outlet valves independently of the pressure supply unit; and/or the control unit is enabled to actuate the pressure supply unit taking into account wheel brake pressures calculated or prevailing in the one or more wheel brakes, wherein the pressure supply unit is enabled to generate nominal pressure(s) to be set for the respective one(s) of the one or more wheel brakes with open third controllable switching valve(s), and after reaching the nominal pressure(s), the control device is configured to close the respective third controllable switching valve(s) to maintain the nominal pressure(s) in respective one(s) of the one or more wheel brakes, wherein by means of the one or more outlet valves, pressure is able to be reduced in at least one wheel brake of the one or more wheel brakes assigned to the one or more outlet valves independently of the pressure-generating unit.

13. A brake system for motor vehicles, including:
an actuation device in the form of a brake pedal,
a travel simulator arranged to generate a feedback force on the actuation device,
a first piston-cylinder device, wherein the piston-cylinder device has at least one piston and at least one working chamber and is connected via one or more hydraulic connecting lines to one or more wheel brakes of one or more brake circuits,
a control device,
at least one pressure supply unit driven by an electric motor and having a double-stroke piston, a first working chamber, and a second working chamber, wherein, by means of the pressure supply unit, brake pressure is enabled to be built up or reduced in one or more of the wheel brakes simultaneously, wherein the first working chamber is connectable via a first controllable switching valve with a storage container and the second working chamber is connectable via a second controllable switching valve with the storage container, and
one or more outlet valves, wherein either a respective outlet valve of the one or more outlet valves is associated with only a respective one of the one or more wheel brakes or a respective outlet valve of the one or more outlet valves is associated with only one wheel brake of a respective one of the one or more brake circuits, wherein the one or more outlet valves are arranged in respective hydraulic connection(s) between the wheel brake(s) with which it/they are associated and the storage container, there being no further valve(s) arranged between the one or more outlet valves and the storage container,
wherein the brake system is adapted to determine a required pressure change in one or more wheel brakes, wherein the brake system is further adapted to utilize a pressure-volume mapping to determine a defined stroke distance for the required pressure change, wherein a pressure volume control is implemented by displacing the double-stroke piston by the defined stroke distance, wherein at least one of the one or more wheel brakes is assigned to a respective one of the brake circuits and each of the one or more wheel brakes is enabled to be connected to an associated one of the one or more connecting lines via a respective third controllable switching valve, wherein the respective controllable switching valve is open in an unpowered state, and wherein the wheel brake pressure is reducible via establishing a hydraulic connection of one of the first or second working chambers of the pressure supply unit with the storage container by opening the respective one of the first or second controllable switching valve as follows:

a) in at least one or more of the wheel brakes, controlled pressure reduction is arranged to occur via the respective third controllable switching valve associated with the respective wheel brake(s) via the pressure volume control by means of a return stroke of the double-stroke piston into the storage container, and/or b) in at least one or more of the wheel brakes, controlled pressure reduction takes place via the respective third controllable switching valve associated with the respective wheel brake(s) via the pressure volume control by means of a forward stroke of the double-stroke piston into the storage container, wherein the wheel brake pressure of the at least one or more of the wheel brakes is further reducible by opening the respective one of the one or more outlet valves associated with the at least one of the one or more wheel brakes or the wheel brake of the respective one of the one or more brake circuits by, in parallel with a) and/or b), in at least one wheel brake, using a time control of the respective one of the one or more outlet valves to allow pressure medium to thereby flow into the storage container, wherein the control device includes a memory that stores actual wheel brake pressures set in the respective wheel brakes and/or continuously calculates in a control model probable brake pressures of the respective wheel brakes and updates these with measured values, wherein for simultaneous pressure build-up in at least two wheel brakes of one of the brake circuits to different nominal pressures, the control unit evaluates a respective pressure-volume curve of respective wheel brakes of the at least two wheel brakes and using a highest nominal pressure to be generated calculates piston travel of the double-stroke piston required to achieve the highest nominal pressure and moves the double-stroke piston by the piston travel using a drive of the pressure supply unit, wherein a respective third controllable switching valve of the wheel brake of the at least two wheel brakes associated with the highest nominal pressure remains open until the highest nominal pressure has been set in the wheel brake associated with the highest nominal pressure; and wherein for the third controllable switching valves associated with the other wheel brakes not associated with the highest nominal pressure, the control device calculates individually respective temporal duration(s) for which the respective third controllable switching valves must remain open so that pressures in the respective wheel brakes in the other wheel brakes are built up to their respective nominal pressures, and wherein the control device opens the third controllable switching valves associated with the other wheel brakes only for the respective calculated duration(s), wherein the third controllable switching valve of the wheel brake associated with the highest nominal pressure is opened first at a time at which the pressure in the associated one of the brake circuits is equal to or lower than an actual pressure associated with the wheel brake associated with the highest nominal pressure at the same time as or temporally overlapping pressure build-up in the other wheel brakes not associated with the highest nominal pressure over the brake circuit(s), wherein pressure is reduced in at least one of the one or more wheel brakes by opening of an associated outlet valve of the at least one wheel brake or a brake circuit of the one or more brake circuits with which the at least one wheel brake is associated.

14. A method of testing tightness and movability of a floating piston of a brake system for vehicles including:

an actuation device in the form of a brake pedal, a travel simulator arranged to generate a feedback force on the actuation device, a first piston-cylinder device, wherein the piston-cylinder device has at least one piston and at least one working chamber and is connected via one or more hydraulic connecting lines to one or more wheel brakes of one or more brake circuits, wherein the floating piston corresponds to the at least one piston of the first piston-cylinder unit, a control device, at least one pressure supply unit driven by an electric motor and having a double-stroke piston, a first working chamber, and a second working chamber, wherein, by means of the pressure supply unit, brake pressure is enabled to be built up or reduced in one or more of the wheel brakes simultaneously, wherein the first working chamber is connectable via a first controllable switching valve with a storage container and the second working chamber is connectable via a second controllable switching valve with the storage container, and one or more time controllable outlet valves, wherein either an outlet valve of the one or more outlet valves is associated with only one of the wheel brakes or an outlet valve of the one or more outlet valves is associated with only one wheel brake of a respective one of the brake circuits, wherein the one or more outlet valves are arranged in respective hydraulic connections between the only one of the wheel brakes or the only one of the wheel brakes of the respective one of the brake circuits and the storage container, there being no further valve arranged between the one or more outlet valves and the storage container, wherein at least one of the one or more wheel brakes is assigned to a respective one of the brake circuits and each of the one or more wheel brakes is enabled to be connected to an associated one of the one or more connecting lines via a respective third controllable switching valve, wherein the respective controllable switching valve is open in an unpowered state, wherein the wheel brake pressure is reducible via establishing a hydraulic connection of one of the first or second working chambers of the pressure supply unit with the storage container by opening the respective one of the first or second controllable switching valve as follows:

a) in at least one or more of the wheel brakes, controlled pressure reduction is arranged to occur via the respective third controllable switching valve associated with the respective wheel brake(s) via a pressure volume control by means of a return stroke of the double-stroke piston into the storage container, and/or b) in at least one or more of the wheel brakes, controlled pressure reduction takes place via the respective third controllable switching valve associated with the respective wheel brake(s) via a pressure volume control by means of a forward stroke of the double-stroke piston into the storage container, and wherein the wheel brake pressure is further reducible, in parallel with a) and/or b), in at least one of the one or more wheel brakes, via at least one respective one of the one or more time controllable outlet valves into the storage container using time control, wherein the first piston-cylinder unit has a radially running channel in its cylinder wall that opens into a first working chamber of the at least one working chamber of the first piston-cylinder unit, wherein a mouth opening of the channel is closed by the floating piston as soon as the floating piston has been moved out of its normal position, wherein the channel is hydraulically connected to one of the working chambers of the pressure supply unit, wherein a mechanical stop is arranged in the first piston-cylinder unit and a spring force-loads the floating piston in a direction of the stop, wherein the floating piston is in its normal position when it lies on the stop, the method including:

a. using the pressure supply unit, building up a pressure in the first working chamber and switching valves such that a pressure in a second working chamber of the piston-cylinder unit is greater than the pressure in the first working chamber, such that the floating piston moves and closes a connecting line to the pressure supply unit, in particular with open third controllable switching valves in a first one of the brake circuits and closed third controllable switching valves in a second one of the brake circuits;

b. using the pressure supply unit to produce a test travel profile of the floating piston and/or a temporal pressure-volume curve in one of the working chambers of the first piston-cylinder unit;

c. using a signal from a pressure sensor to obtain a pressure curve, and comparing the pressure curve to a nominal value curve with open third controllable switching valves.

15. The method according to claim 14, further including:

storing pressure in the second one of the brake circuits by closing of the third controllable switching valves associated with the second one of the brake circuits during a parking stop with the vehicle stationary;

using the pressure supply unit to subsequently reduce pressure in the first one of the brake circuits to 0 to 1 bar;

subsequently blocking the pressure supply unit such that no further piston movement of the double-stroke piston of the pressure supply unit takes place, wherein the control device closes an isolating valve associated with the second one of the brake circuits;

subsequently opening the third controllable switching valves associated with the second one of the brake circuits, whereby because of pressure on a back side of the floating piston, the floating piston moves and builds up the pressure in the first one of the brake circuits until a pressure equilibrium exists between the first and second ones of the brake circuits; and measuring pressure in one of the first or second ones of the brake circuits by means of a pressure sensor, and evaluating a determined pressure curve.

\* \* \* \* \*